US007899496B2

(12) United States Patent
Rhodes et al.

(10) Patent No.: US 7,899,496 B2
(45) Date of Patent: Mar. 1, 2011

(54) CELLULAR ANTENNA

(75) Inventors: Daniel Rhodes, Wellington (NZ); Andrew Thomas Gray, Wellington (NZ); Arthur George Roberts, Wellington (NZ); Peter Bruce Graham, Wellington (NZ)

(73) Assignee: Andrew LLC, Hickory, NC (US)

( * ) Notice: Subject to any disclaimer, the term of this patent is extended or adjusted under 35 U.S.C. 154(b) by 1371 days.

(21) Appl. No.: 10/312,979

(22) PCT Filed: Jul. 10, 2001

(86) PCT No.: PCT/NZ01/00137
§ 371 (c)(1), (2), (4) Date: Jun. 16, 2003

(87) PCT Pub. No.: WO02/05383
PCT Pub. Date: Jan. 17, 2002

(65) Prior Publication Data

US 2004/0038714 A1 Feb. 26, 2004

(30) Foreign Application Priority Data

Jul. 10, 2000 (NZ) .................................... 505656
Apr. 3, 2001 (NZ) .................................... 510913

(51) Int. Cl.
*H04M 1/00* (2006.01)

(52) U.S. Cl. ...................... 455/562.1; 455/561; 455/272; 455/273; 455/276.1; 343/853; 343/810

(58) Field of Classification Search ............... 455/562.1, 455/561, 272, 273, 276.1; 343/853, 810
See application file for complete search history.

(56) References Cited

U.S. PATENT DOCUMENTS 4,124,852 A 11/1978 Steudel
4,445,119 A 4/1984 Works
4,467,328 A * 8/1984 Hacker .......................... 342/14
4,827,270 A 5/1989 Udagawa et al.
5,115,248 A 5/1992 Roederer (Continued)

FOREIGN PATENT DOCUMENTS

CA 2220745 8/1998

(Continued)

OTHER PUBLICATIONS

International Search Report for PCT/NZ01/00137.

(Continued)

*Primary Examiner* — Ajit Patel
*Assistant Examiner* — Khai M Nguyen
(74) *Attorney, Agent, or Firm* — Husch Blackwell LLP

(57) ABSTRACT

An antenna for communicating with mobile devices in a land-based cellular communication system via an antenna beam having a width, azimuth angle and downtilt angle. The antenna includes: a two dimensional array of radiating elements (31-34); and a feed network (35-39) from a feed line to the radiating elements. The feed network includes: downtilt phase shifting means (35,36) for varying the phase of signals supplied to or received from the radiating elements so as to vary the downtilt angle of the antenna beam; azimuth phase shifting (38,39) means for varying the phase of signals supplied to or received from the radiating elements so as to vary the azimuth angle of the antenna beam; and beam width adjustment means (37) for varying the power or phase of signals supplied to or received from the radiating elements so as to vary the width of the antenna beam.

23 Claims, 18 Drawing Sheets

U.S. PATENT DOCUMENTS

| | | | |
|---|---|---|---|
| 5,151,706 | A | 9/1992 | Roederer et al. |
| 5,333,001 | A | 7/1994 | Profera, Jr. |
| 5,596,329 | A | 1/1997 | Searle et al. |
| 5,734,349 | A | 3/1998 | Lenormand et al. |
| 5,818,385 | A | 10/1998 | Bartholomew |
| 5,949,370 | A | 9/1999 | Smith et al. |
| 6,070,090 | A * | 5/2000 | Feuerstein .................... 455/561 |
| 6,078,824 | A | 6/2000 | Sogo |
| 6,097,267 | A | 8/2000 | Hampel |
| 6,188,373 | B1 * | 2/2001 | Martek .......................... 343/893 |
| 6,198,458 | B1 * | 3/2001 | Heinz et al. .................... 343/853 |
| 6,239,744 | B1 * | 5/2001 | Singer et al. ................... 342/359 |
| 6,268,828 | B1 * | 7/2001 | Martek .......................... 342/373 |
| 6,294,956 | B1 | 9/2001 | Ghanadan et al. |
| 6,922,169 | B2 * | 7/2005 | Moh'd Izzat et al. ......... 342/360 |
| 2004/0087294 | A1 * | 5/2004 | Wang .......................... 455/276.1 |

FOREIGN PATENT DOCUMENTS

| | | | |
|---|---|---|---|
| CA | 2333922 | | 6/1999 |
| CN | 1191460 | A | 8/1998 |
| CN | 1253640 | A | 5/2000 |
| EP | 0 543 509 | B1 | 7/1998 |
| EP | 0 600715 | B1 | 1/1999 |
| EP | 0915529 | A1 | 5/1999 |
| EP | 0984508 | A2 | 3/2000 |
| EP | 1 032 074 | A1 | 8/2000 |
| EP | 0 984 508 | A3 | 8/2001 |
| GB | 2288913 | | 11/2000 |
| JP | 63287101 | | 11/1988 |
| JP | 7087011 | | 3/1995 |
| JP | 10285097 | | 10/1998 |
| JP | 11509058 | | 8/1999 |
| JP | 2001506102 | | 8/2001 |
| WO | WO95/10862 | | 4/1995 |
| WO | WO96/14670 | | 5/1996 |
| WO | WO97/02675 | | 6/1996 |
| WO | WO98/52031 | | 5/1998 |
| WO | WO 01/03414 | A1 | 1/2001 |
| WO | WO 01/06595 | A2 | 1/2001 |
| WO | WO 02/37605 | A1 | 5/2002 |

OTHER PUBLICATIONS

Two (2) pages from www.3gnewsroom.com/3g_news/oct_01/news_1247.shtml—Jul. 15, 2002.

One (1) page from www.kmwinc.com/eng/newproducts/contents/3way.htm—Jul. 15, 2002.

Compendex an 2000-064955659-M.

Compendex an 1998-053955707-M.

INSPEC An 5248191.

INSPEC An 6202678.

INSPEC An 5249627.

INSPEC An 5248176.

May 25, 2007, The Second Office Action received from The Patent Office of The State Intellectual Property Office of The People's Republic of China—re Patent Application No. 01812519.0. Publication documents as cited in the Examination procedure are EP0984508A2, Publ. Date Mar. 8, 2000; CN1253640A, Publ. Date May 17, 2000 (3 pages).

May 13, 2005, The First Office Action (PCT Application In The National Phase) received from The Patent Office of The State Intellectual Property Office of The People's Republic of China re Patent Application No. 01812519.0. Publication documents as cited in the Substantive Examination procedure are CN1191460A, Publication Date Aug. 26, 1998. (3 pages).

* cited by examiner

CELLULAR ANTENNA

FIELD OF THE INVENTION

The present invention relates to an antenna for communicating with mobile devices in a land-based cellular communication system. The invention also relates to an antenna system and a cellular communication system incorporating one or more antennas.

BACKGROUND OF THE INVENTION

Antennas used in early cellular base stations typically did not include means for varying antenna beam direction and had to be mounted to a support structure at an inclination required to provide a beam producing the required cell coverage. More recent antennas have included means for remotely adjusting downtilt of the beam of an antenna of a cellular base station. WO96/14670 discloses an antenna having mechanically adjustable phase shifters which produce variable electrical phase shifts in the feed path of the antenna to effect downtilting of the beam of an antenna.

Phased array antennas, used in radar applications, provide both azimuth beam steering and vertical beam tilting (downtilt) to direct the beam of an antenna in a required direction. Such antennas have typically employed active switching elements and been of complex and expensive construction.

If more than one characteristic of the beam of an antenna of a cellular base station could be varied, cellular communication systems could be more flexible in allocating capacity to desired areas.

The applicant's prior application WO96/14670 discloses an antenna control system for remotely adjusting the downtilt of a plurality of antennas. The controller 80 is located at the base of a cellular base station and a separate cable 78 is required to control each antenna. This requires a new control cable 78 to be run from the mast head to controller 80 each time a new antenna is added.

In the system of WO96/14670 each antenna is identified by the port to which cable 78 is connected. The number of antennas that may be controlled by a controller 80 is limited by the number of available ports.

Prior art systems have utilised proprietary controllers to remotely adjust antenna characteristics. It would be desirable to enable standard devices that are widely available to be utilised to program and control the antenna control systems.

DISCLOSURE OF THE INVENTION

It is an object of the invention to provide an antenna control system, an antenna and an antenna system that overcomes at least some of the limitations of the prior art or to at least provide the public with a useful choice.

A first aspect of the invention provides an antenna for communicating with mobile devices in a land-based cellular communication system via an antenna beam having a width, azimuth angle and downtilt angle, the antenna including:

- a two dimensional array of radiating elements; and
- a feed network from a feed line to the radiating elements, the feed network including:
  - downtilt phase shifting means for varying the phase of signals supplied to or received from the radiating elements so as to vary the downtilt angle of the antenna beam;
  - azimuth phase shifting means for varying the phase of signals supplied to or received from the radiating elements so as to vary the azimuth angle of the antenna beam; and

- beam width adjustment means for varying the power or phase of signals supplied to or received from the radiating elements so as to vary the width of the antenna beam The first aspect of the invention provides an antenna having a beam angle which is adjustable in horizontal (azimuth) and vertical (downtilt) directions, as well as having adjustable beam width.

A second aspect of the invention provides an antenna for communicating with mobile devices in a land-based cellular communication system via an antenna beam having a width and an angle, the antenna including:

- a plurality of radiating elements; and
- a feed network from a feed line to the radiating elements, the feed network including:
  - power dividing means for varying the division of power between radiating elements so as to vary the width of the antenna beam; and
  - phase shifting means for varying the phase of signals supplied to or received from the radiating elements so as to vary the angle of the antenna beam.

The second aspect provides a preferred feed network which gives adjustable beam width and adjustable beam angle (which may be adjustable in the azimuth and/or downtilt directions).

Preferably the power dividing means divides power between one or more central radiating elements and two or more outer radiating elements positioned in the array on opposite sides of the central radiating element(s).

Preferably the power dividing means is a substantially non-attenuating power divider, for example including a pair of hybrid couplers and a phase shifter between the hybrid couplers.

Preferably the downtilt or azimuth phase shifting means adjusts the relative phase between the pair of outer radiating elements.

Preferably the phase relationship between the central radiating element(s) and the power dividing means is substantially fixed for all beam angles.

In an alternative arrangement the beam width adjustment means includes means for varying the phase of signals supplied to or received from the radiating elements so as to vary the width of the antenna beam.

Preferably the array includes at least three rows and at least three columns of radiating elements.

The antenna is particular suited to a code-division multiple access system (CDMA or W-CDMA) employing a CDMA encoder and/or decoder.

Typically the antenna is part of a land-based antenna system including control means adapted to provide signals to the antenna(s) to adjust a characteristic of the antenna beam.

The control means typically includes a local receiver adapted to receive commands from a remote control centre.

A third aspect of the invention provides an antenna system for communicating with mobile devices in a land-based cellular communication system via an antenna beam, the antenna system including:

- an antenna having a plurality of radiating elements, and an RF feed line for transmitting signals to and/or from the radiating elements;
- transmission means coupled to the RF feed line; and
- control means for adjusting a characteristic of the antenna beam in accordance with control data received from the transmission means via the RF feed line.

A fourth aspect of the invention provides an antenna system for communicating with mobile devices in a land-based cellular communication system, the antenna system including:

a plurality of antennas each having phase shifting means for adjusting a characteristic of the beam of the antenna, each antenna being provided at an elevated height on a structure; and an antenna control system for controlling the phase shifting means, the antenna control system being provided at an elevated height near the antennas.

A fifth aspect of the invention provides an antenna system for communicating with mobile devices in a land-based cellular communication system, the antenna system including:

a plurality of radiating elements;

one or more phase shifter provided in a feed network to the plurality of radiating elements for adjusting a characteristic of the beam of the antenna; and control means for driving electromechanical means associated with each phase shifter wherein the control means includes processing means to control the antenna in accordance with control data supplied thereto.

The systems according to the invention are typically provided as part of a land-based cellular communication system including a remote control centre for issuing commands to each antenna system to adjust antenna beam characteristics of each system.

A sixth aspect of the invention provides an antenna control system for controlling the beam characteristics of a plurality of antennas which communicate with mobile devices in a land-based cellular communication system, the antenna control system including:

means for receiving a command to change a beam characteristic of one of the antennas;

means for calculating the beam characteristics required for all of the antennas to achieve a desired coverage; and means for adjusting one or more beam characteristic of each antenna as required to achieve the desired coverage.

A seventh aspect of the invention provides a computer for controlling an antenna which communicates with mobile devices in a land-based cellular communication system, the computer including:

graphical user interface means for graphically displaying parameters of the configuration of a plurality of antennas wherein, via use of an input device, graphical elements may be manipulated to adjust parameters of the configuration; and communication means for sending control signals to an actuation means to adjust parameters of an antenna in accordance with those displayed by the graphical user interface.

BRIEF DESCRIPTION OF THE DRAWINGS

The invention will now be described by way of example with reference to the accompanying drawings in which.

DETAILED DESCRIPTION OF THE BEST MODE FOR CARRYING OUT THE INVENTION

Figure 1:
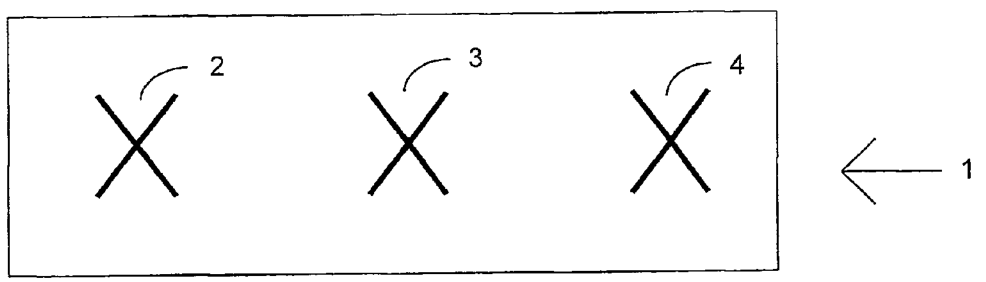
FIG. 1: shows a three radiating element array antenna.
Figure 2:
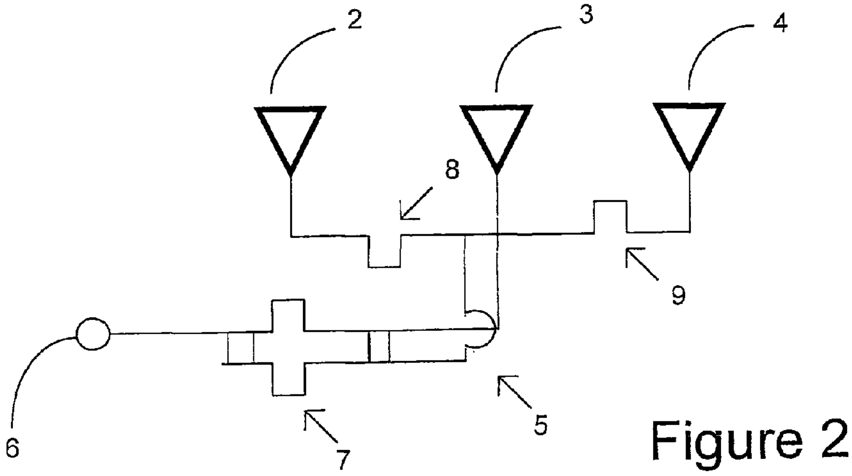
FIG. 2: shows a schematic diagram of the feed network for the antenna shown in FIG. 1.

Referring to FIG. 1 an antenna 1 has an array of three radiating elements 2, 3, 4 arranged in a single row. FIG. 2 shows a schematic diagram of the feed network 5 from a connector 6 to the radiating elements 2, 3 and 4. Power divider 7 divides power between antennas 2 and 4 and antenna 3. Adjustment of power divider 7 results in variation of beam width of the beam of antenna 1.

Figure 2A:
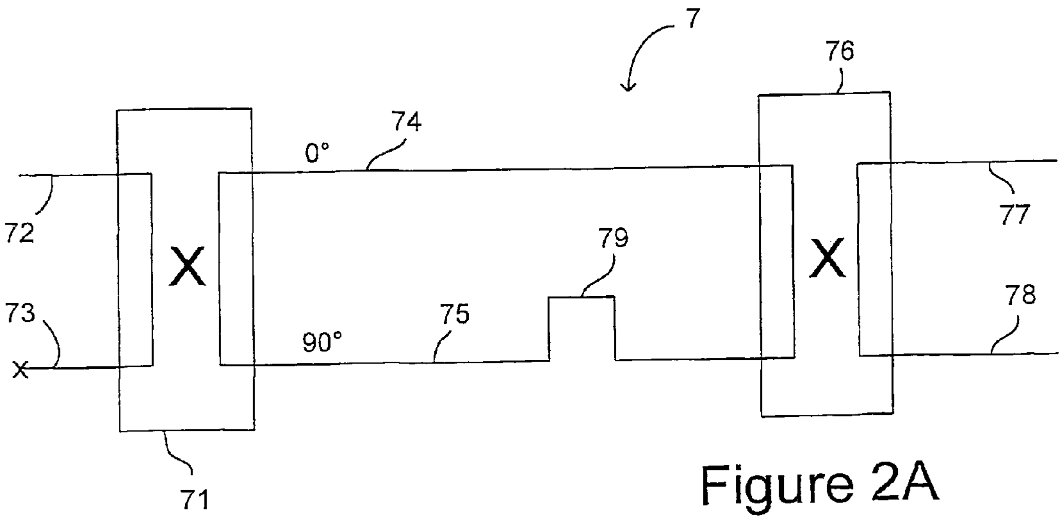
FIG. 2A: shows the variable power divider.

Power divider 7 is shown in detail in FIG. 2A. A first hybrid coupler 71 has an input port 72 coupled to connector 6 and a port 73 which is isolated. The hybrid coupler 71 splits the input signal into two signals with equal amplitude which are output on lines 74, 75 with a phase difference of 90. The phase of the signal on line 75 can be adjusted by a phase shifter 79 which adjust the length L2 of line 75 compared to the length L1 of line 74. The lines 74, 75 are coupled to a second hybrid coupler 76 which splits and combines the signals with a 90 phase shift. When L1=L2 the signals interfere constructively at output 78 and cancel each other out at output 77. If L1 L2 then the signal is divided between outputs 77, 78, the ratio being determined by the position of the phase shifter 79. For a certain ratio between L1 and L2 all of the signal is output on output 77 and no signal is output on output 78. It will be noted that the power divider 7 is substantially non-attenuating—that is, it does not employ any attenuators (such as resistors) which would result in power loss and overheating.

Phase shifters 8 and 9 differentially vary the phase of radiating elements 2 and 4 with respect to radiating element 3. Phase shifters 8 and 9 may be incorporated within a single variable differential phase shifter of the type described in WO 96/14670. Adjustment of phase shifters 8 and 9 results in azimuth steering of the antenna beam.

The simple three element array described in FIGS. 1 and 2 thus allows azimuth steering by adjustment of phase shifters 8 and 9 and azimuthal beam width adjustment by variation of power divider 7.

Figure 3:
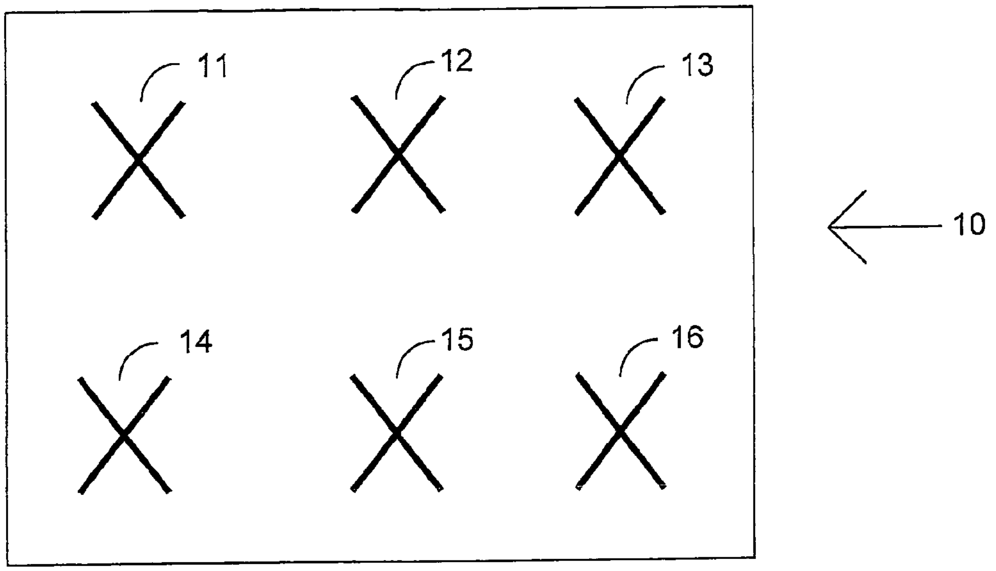
FIG. 3: shows a six element array antenna.
Figure 4:
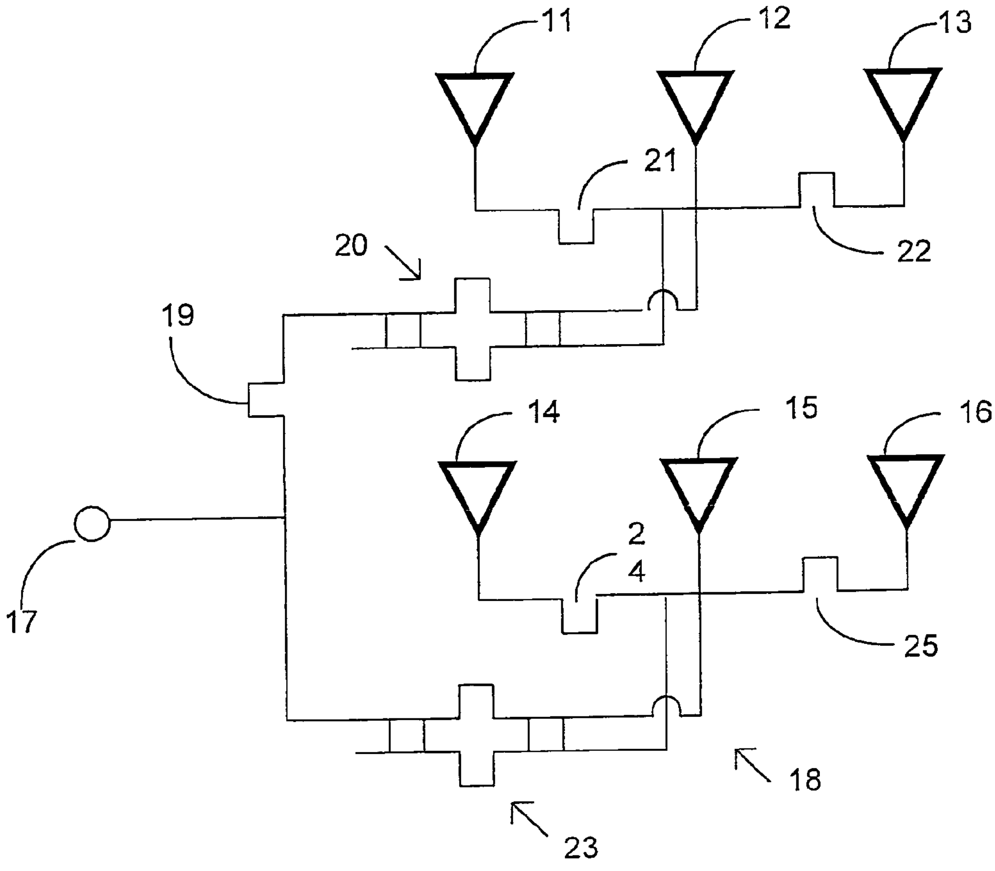
FIG. 4: shows a schematic diagram of the feed network of the antenna shown in FIG. 3.

Referring now to FIG. 3, antenna 10 includes six radiating elements 11 to 16. In FIG. 4 a schematic diagram of the feed network for the antenna shown in FIG. 3 is shown.

Signals are conveyed to or from connector 17 to or from the radiating elements via the feed network 18. Phase shifter 19 varies the phase of signals received from or sent to radiating elements 11, 12 and 13 with respect to those received from or transmitted to radiating elements 14, 15 and 16. Variation of the phase between the rows of radiating elements 11 to 13 compared to those of rows 14 to 16 results in vertical tilting of the beam of the antenna (downtilting). Adjustment of phase shifter 19 may thus be utilised to effect downtilting of the beam of the antenna.

The power dividers 20 and 23 and the phase shifters 21, 22, 24 and 25 operate in the manner described in relation to FIG. 2. Power dividers 20 and 23 may be adjusted to modify beam width of the beam of the antenna and phase shifters 21 and 22 and phase shifters 24 and 25 may be adjusted to modify azimuth of the beam of the antenna. Power dividers 20 and 23 may be driven by a common mechanical linkage so that the beam width is adjusted uniformly for both rows of radiating elements. Likewise, phase shifters 21 and 22 and phase shifters 24 and 25 may be driven by a common mechanical linkage so that the azimuth of the beam of the antenna is constant for both rows.

Figure 5:
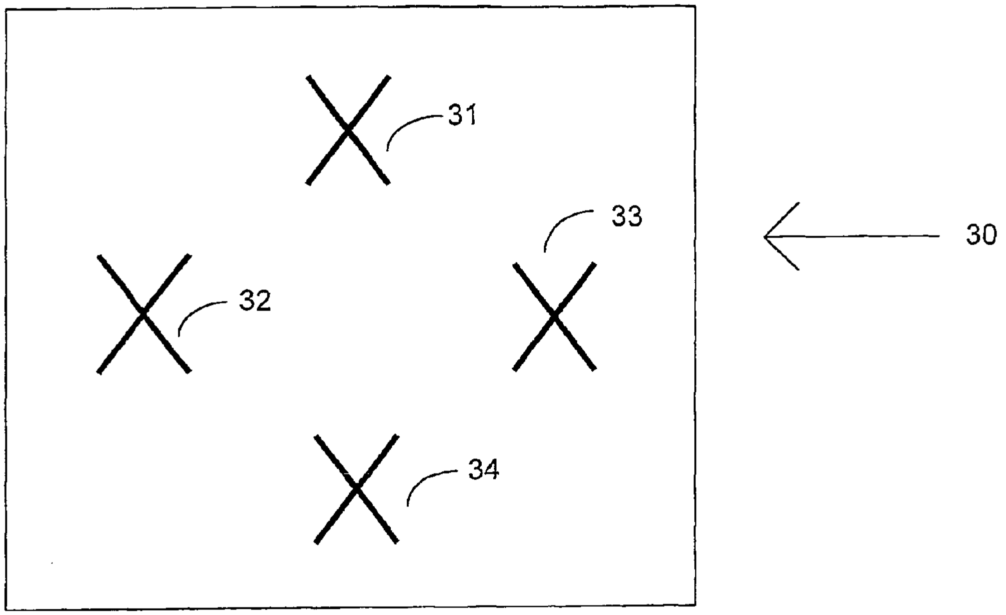
FIG. 5: shows a four element array antenna.
Figure 6:
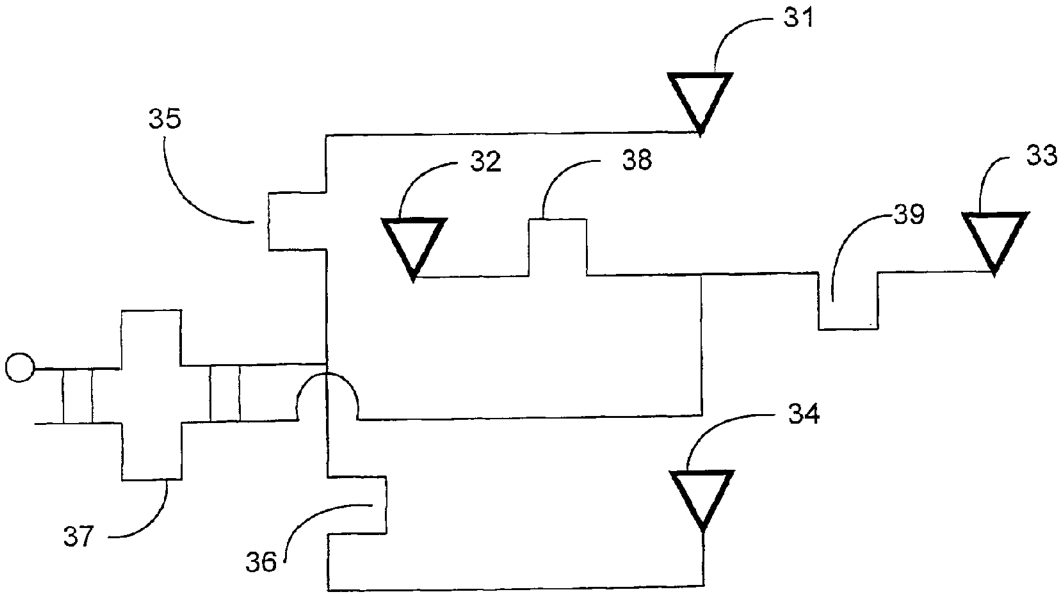
FIG. 6: shows a schematic diagram of the feed network of the antenna shown in FIG. 5.

Referring now to FIG. 5 an alternative diamond arrangement of elements is shown. Antenna 30 includes radiating elements 31, 32, 33 and 34. FIG. 6 shows the feed network for the antenna arrangement shown in FIG. 5.

Phase shifters 35 and 36 differentially vary the phase of the signals supplied to radiating elements 31 and 34 compared with the phase of signals supplied to radiating elements 32 and 33. Adjustment of phase shifters 35 and 36 may thus adjust downtilt of the beam of the antenna. Phase shifters 35 and 36 may be provided as a single variable differential phase shifter.

Power divider 37 adjusts the division of power between radiating elements 32 and 33 and radiating elements 31 and 34. This enables adjustment of beam width of the beam of the antenna.

Phase shifters 38 and 39 allow variable differential phase shifting of the phase of signals supplied to or received from radiating elements 32 and 33 with respect to the phase of signals supplied to or received from radiating elements 31 and 34. This enables adjustment of the azimuth of the beam of the antenna. Phase shifters 38 and 39 may be provided as a single variable differential phase shifter.

Figure 7:
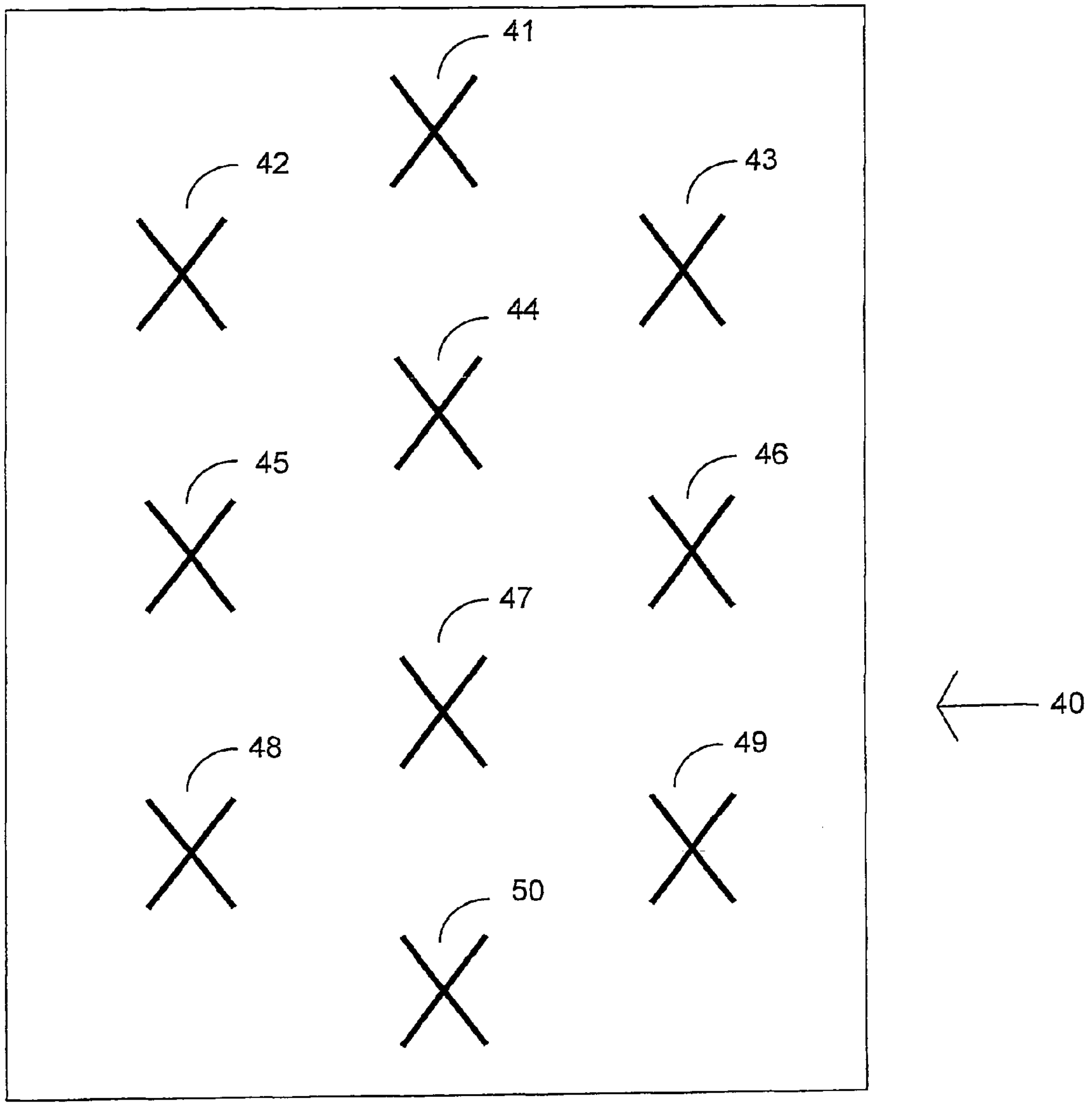
FIG. 7: shows a ten element array antenna.

Referring now to FIG. 7 an antenna configuration of a preferred design for use in cellular communications base stations is shown. An antenna for use in a cellular base station preferably includes at least 3 columns of elements and 3 vertically spaced apart groups of elements. This enables good beam symmetry to be achieved. Antenna 40 includes radiating elements 41 to 50 arranged in three columns: 42, 45 and 48; 41, 44, 47 and 50; and 43, 46 and 49. The radiating elements are also divided into three groups 41-43; 44-47; and 48-50. These three groups fall within three broad rows across antenna 40.

Figure 8:
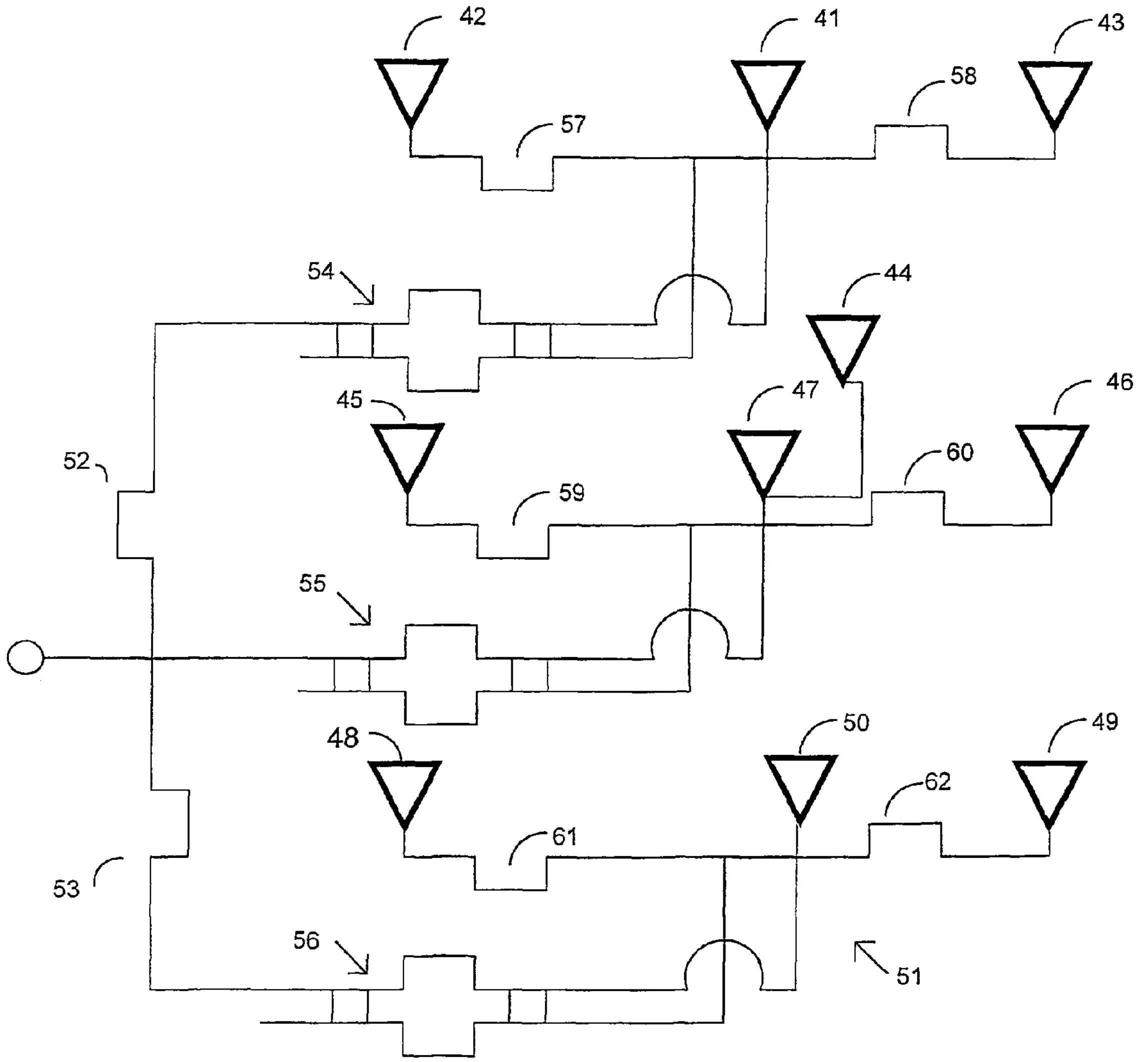
FIG. 8 shows a schematic diagram of the feed network of the antenna shown in FIG. 7.

Referring now to FIG. 8 the feed network 51 is shown schematically. Phase shifters 52 and 53 differentially shift the phase of signals received from/sent to the first row of radiating elements (41-43) and the third row of radiating elements (48-50) with respect to the middle row of radiating elements (44-47). This allows the downtilt of the beam of the antenna to be adjusted by variation of phase shifters 52 and 53. Phase shifters 52 and 53 may be a single variable differential phase shifter.

Power dividers 54 to 56 may be adjusted to vary beam width in the same manner previously described. Power dividers 54 to 56 are preferably constructed and arranged so that they are adjusted simultaneously so that the beam width of the antenna is constant for each group of radiating elements.

Phase shifters 57 to 62 operate in the same manner as discussed previously to effect azimuth steering. Each pair of phase shifters 57 and 58; 59 and 60; and 61 and 62 may consist of a single variable differential phase shifter. Again these phase shifters are preferably driven in tandem so that the azimuth of the beam of each group of radiating elements is aligned.

Another preferred arrangement is an array of 15 radiating elements regularly arranged in 5 rows and 3 columns.

It will be appreciated that a range of other possible radiating element and feed arrangements may be employed depending upon the requirements for a particular application.

The radiating elements shown in these embodiments are dipole pairs suitable for use in a dual polarisation antenna. Other radiating elements may be substituted if appropriate for other applications.

Figure 9:
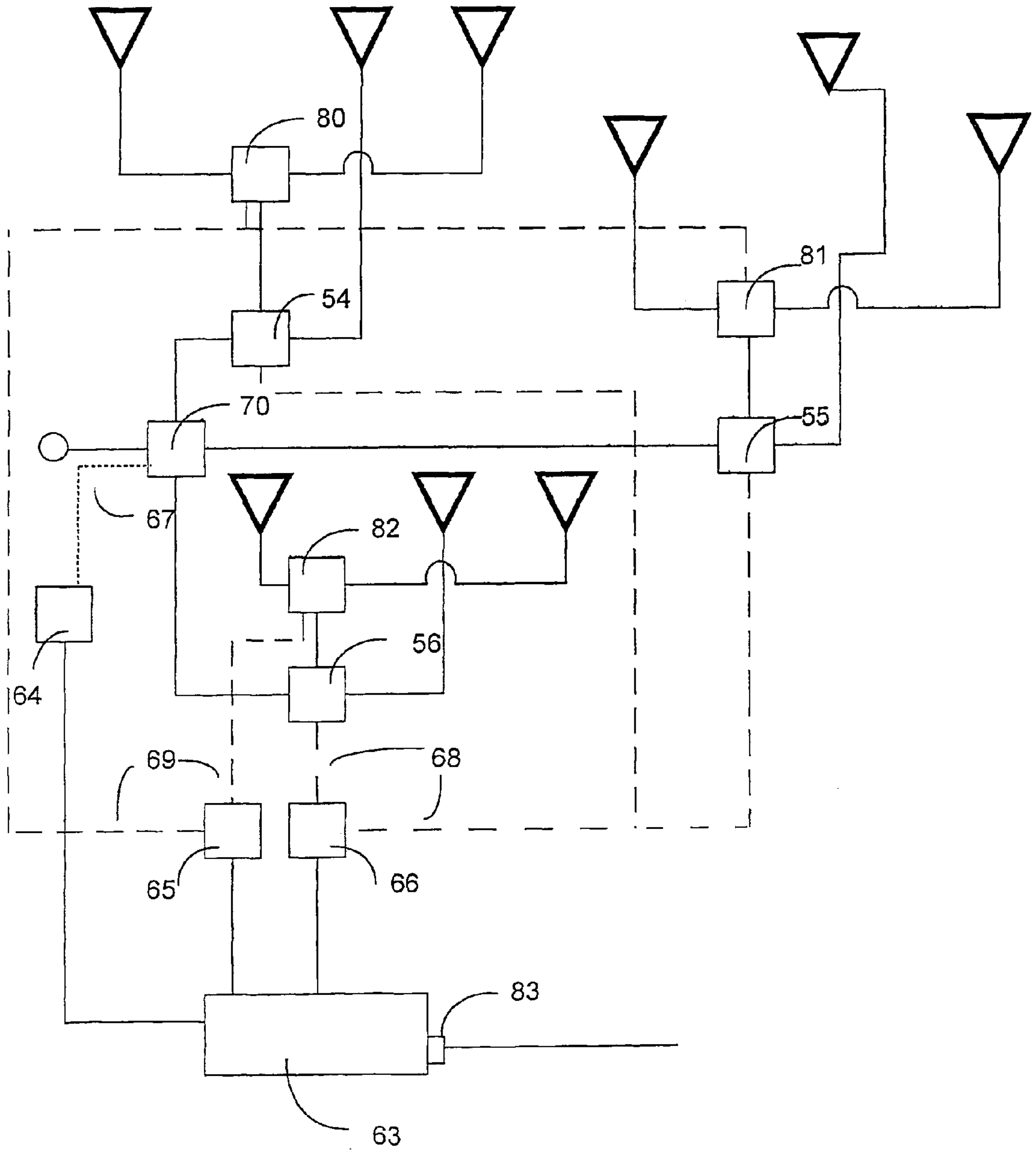
FIG. 9: shows the control arrangement of the antenna shown in FIGS. 7 and 8.

Referring now to FIG. 9 control means for controlling the phase shifters of the antenna shown in FIGS. 7 and 8 is shown. A control means 63 drives motive means 64 to 66. Motive means 64 to 66 may be suitably geared electrical motors or the like.

Motive means 64 adjusts a variable differential phase shifter 70 (phase shifters 52 and 53) to vary the downtilt of the beam of the antenna. Motive means 65 adjusts phase shifters 80, 81 and 82 (phase shifters 57-62) via linkages 69 to adjust the azimuth of the beam of the antenna. Motive means 66 adjusts power dividers 54 to 56 via linkages 68 to adjust beam width of the beam of the antenna. The drive mechanisms and linkages may be of the type disclosed in WO 96/14670.

Port 83 enables control means 63 to communicate with a remote control means. Typically port 83 will be connected to a modem to facilitate remote communication with a control centre via a physical or wireless communication. Control means 63 may convey information about the current configuration and status of the antenna to the remote control centre and the remote control centre may provide instructions for adjustment of the downtilt, azimuth or beam width of the antenna which may be implemented by control means 63. Control means 63 preferably controls a plurality of antennas of the same type as antenna 40.

Figure 10:
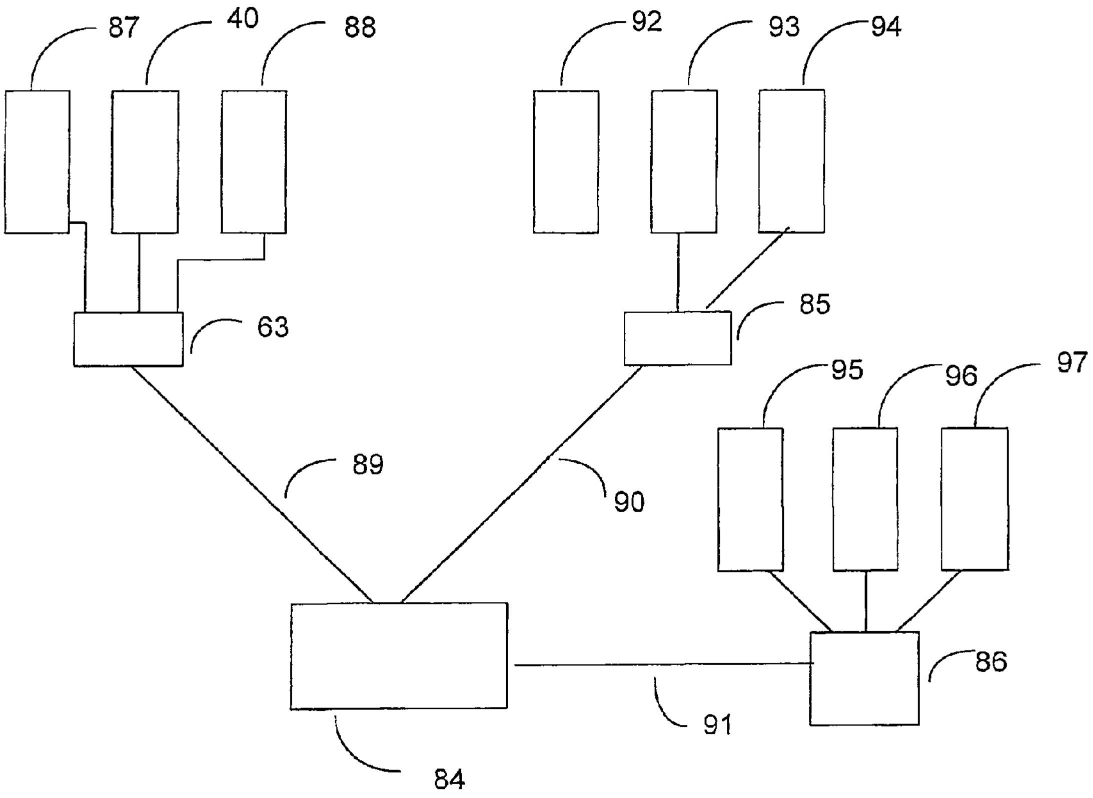
FIG. 10: shows a cellular communications system.

Referring now to FIG. 10 there is shown a cellular communications system in which a control centre 84 is connected to control means 63, 85 and 86 via data links 89 to 91 (physical or wireless). Antennas 87, 88 and 92-97 are of the same type as antenna 40 described above. The phase shifters of the antennas 40, 87 and 88 may be controlled by control means 63 in accordance with instructions received from the control centre 84 over the data link 89. Likewise antennas 92 to 94 at another cellular base station are controlled by control means 85 and antennas 95 to 97 are controlled by control means 86.

It will be appreciated that any number of controllers 63, 85 and 86 may be controlled by a central control centre 84. This enables the zones covered by antennas 40, 87 and 88, antennas 92-94 and antennas 95 to 97 to be controlled by control centre 84 dynamically to meet any demands placed upon a communications system or to configure the system to any desired pattern of coverage.

In an alternative arrangement, the fixed control centre 84 may be replaced (or supplemented) with a mobile (roving) network optimisation unit which communicates via a wireless link.

Figure 11:
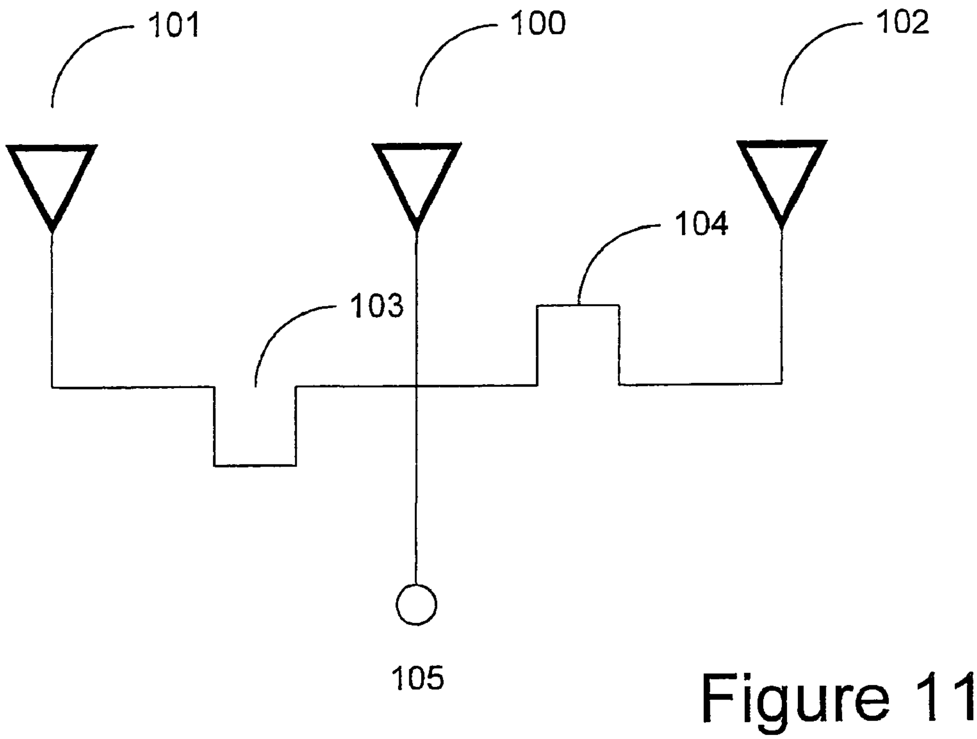
FIGS. 11 to 14: disclose an embodiment utilising only phase shifters.
Figure 12:
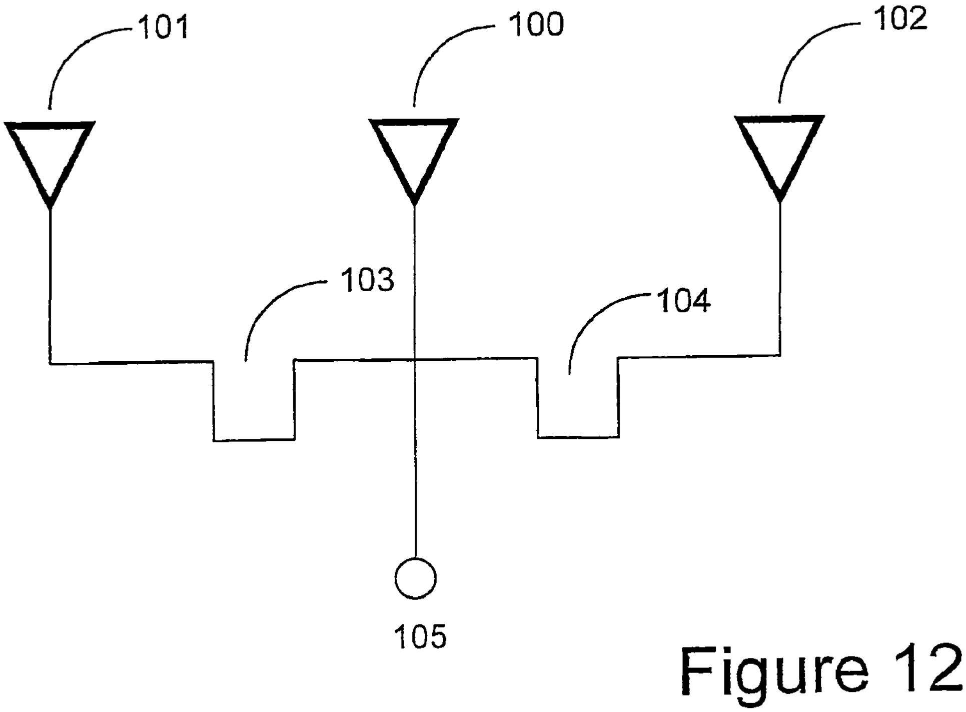
Figure 13:
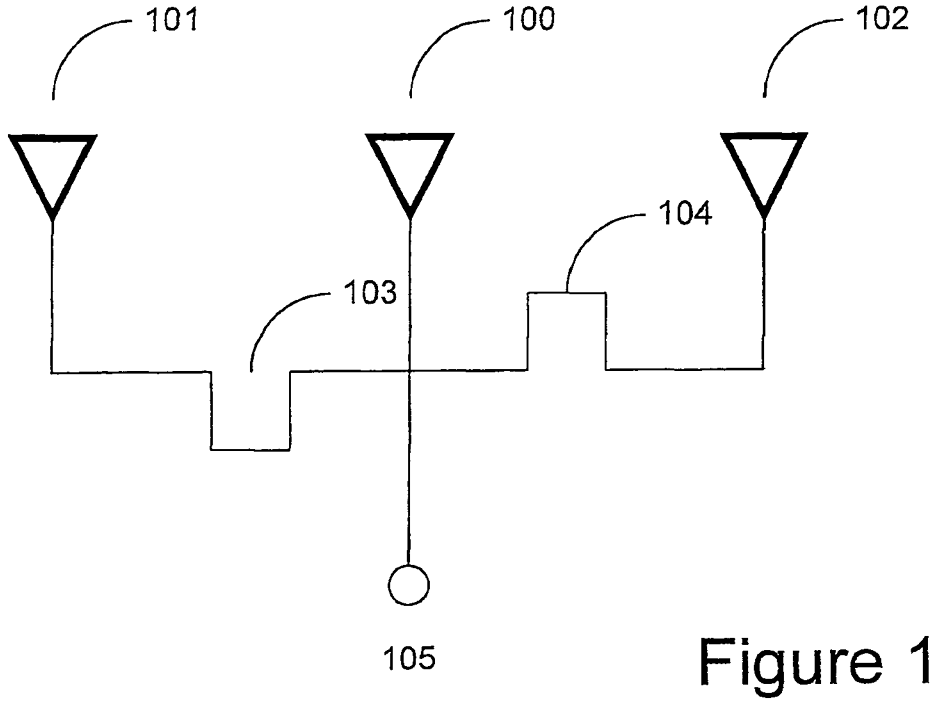

Referring now to FIGS. 11 to 13 an alternative arrangement is shown in which azimuth steering and beam width adjustment is achieved by the use of phase shifters alone.

In this embodiment phase shifters 103 and 104 are independently adjustable. However, phase shifters 103 and 104 could be driven by suitable linkages that enable phase shifters 103 and 104 to be adjusted differentially and in a non-differential manner to achieve azimuth steering and beam width adjustment in a desired manner.

Radiating element 100 is connected directly to feed point 105, radiating element 101 is connected via phase shifter 103 to feed point 105 and radiating element 102 is connected via phase shifter 104 to feed point 105. Phase shifters 103 and 104 may be independently driven by suitable motive means such as a suitably geared electric motor which is responsive to control signals from a control means such as control means 63 shown in FIGS. 9 and 10.

In FIG. 11 phase shifters 103 and 104 are seen to be adjusted in a differential manner to effect beam steering. In FIGS. 12 and 13 phase shifters 103 and 104 phase shifters 103 and 104 are adjusted in unison to effect widening or narrowing of the beam of the antenna. It will be appreciated that when the phase shift to antennas 101 and 102 is increased the beam of the antenna will be widened and when the phase shift is reduced that the beam of the antenna will be narrowed. It will be appreciated that independent adjustment of phase shifters 103 and 104 enables steering and beam width adjustment to be performed simultaneously using only two phase shifters.

Figure 14:
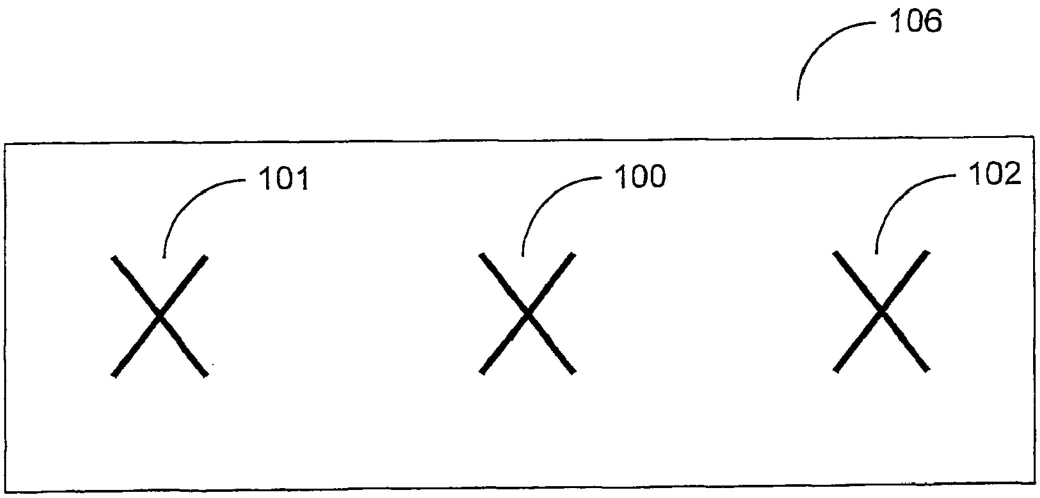

FIG. 14 shows the physical arrangement of radiating elements 100 to 102 of a panel antenna 106.

Figure 15:
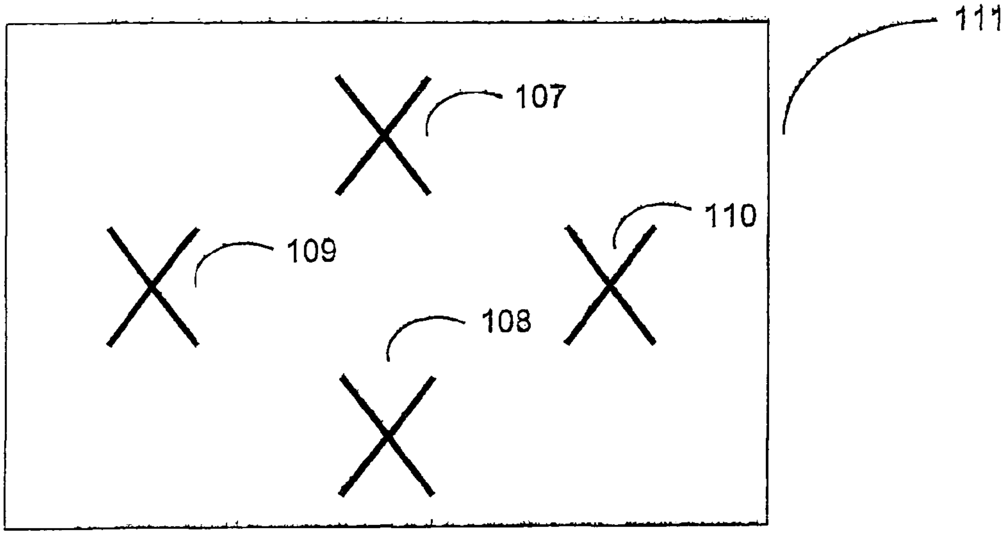
FIGS. 15 & 16: show an embodiment utilising only phase shifters for adjustment of antenna beam direction and width in two dimensions.
Figure 16:
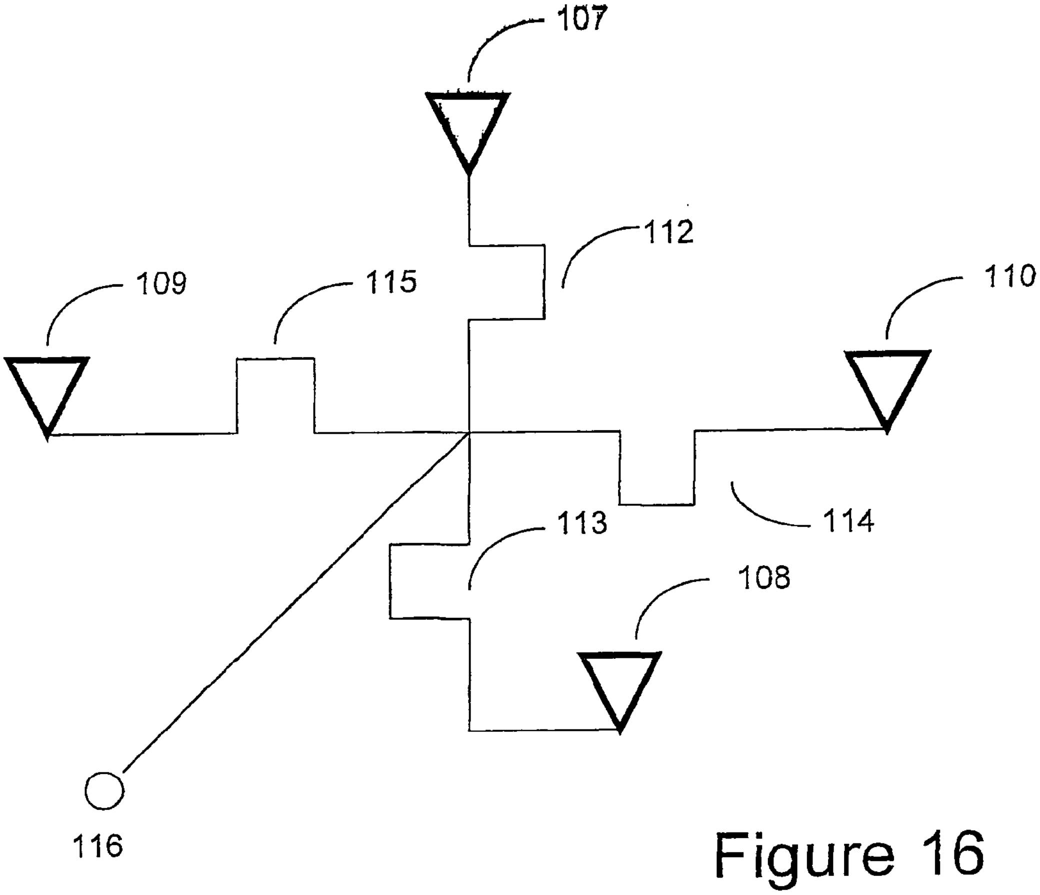

Referring now to FIGS. 15 and 16 an embodiment of the concept described in figures in 11 to 14 is shown using a two dimensional array of radiating elements. In this case radiating elements 107 to 110 of panel antenna 111 are arranged in a diamond configuration.

As shown in FIG. 16 each radiating element 107 to 110 is connected to feed point 116 via a phase shifter 112 to 115. Each of the phase shifters 112 to 115 is independently adjustable. Differential adjustment of phase shifters 114 and 115 can produce azimuth beam steering. Non differential adjustment of phase shifters 114 and 115 can alter the beam width in the horizontal plane. Differential adjustment of phase shifters 112 and 113 can result in beam tilting in the vertical plane. Non differential adjustment of phase shifters 112 and 113 can result in beam width adjustment in the vertical plane.

This arrangement thus enables beam steering in the vertical and horizontal planes as well as beam width adjustment in the vertical and horizontal planes.

FIGS. 15 to 16 show a minimal implementation of the concept and it will be appreciated that greater numbers of radiating elements may be desirable depending upon the application concerned. Although the phase shifters 112 to 115 have been described as being independently adjustable it will be appreciated that the phase shifters may be suitably driven via common mechanical linkages to achieve desired beam shape and direction adjustments.

Figure 17:
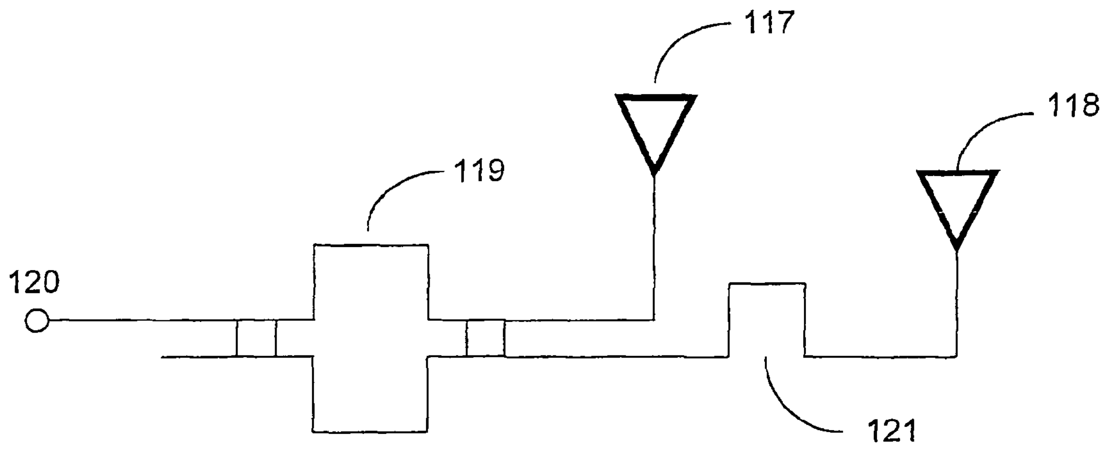
FIG. 17: shows a minimal implementation for effecting beam steering and beam width adjustment.

Referring now to FIG. 17 a minimal implementation for effecting beam width adjustment and azimuth steering is disclosed for completeness. Power divider 119 divides power between radiating elements 117 and 118 to effect beam width adjustment. Phase shifter 121 may be adjusted to effect azimuth steering. This embodiment is described for the sake of completeness and would not be a preferred design due to the lack of symmetry of the beam when radiating elements 117 and 118 are not driven equally.

In a system of the type shown in FIG. 10 it will be appreciated that control centre 84 may need to simultaneously adjust the beam width and/or beam direction of a number of antennas simultaneously. Adjustment of the cell coverage of one antenna may leave a gap that needs to be filled by another antenna. Control centre 84 will preferably have suitable computing means and software to calculate required antenna adjustments to achieve a desired coverage.

Figure 18:
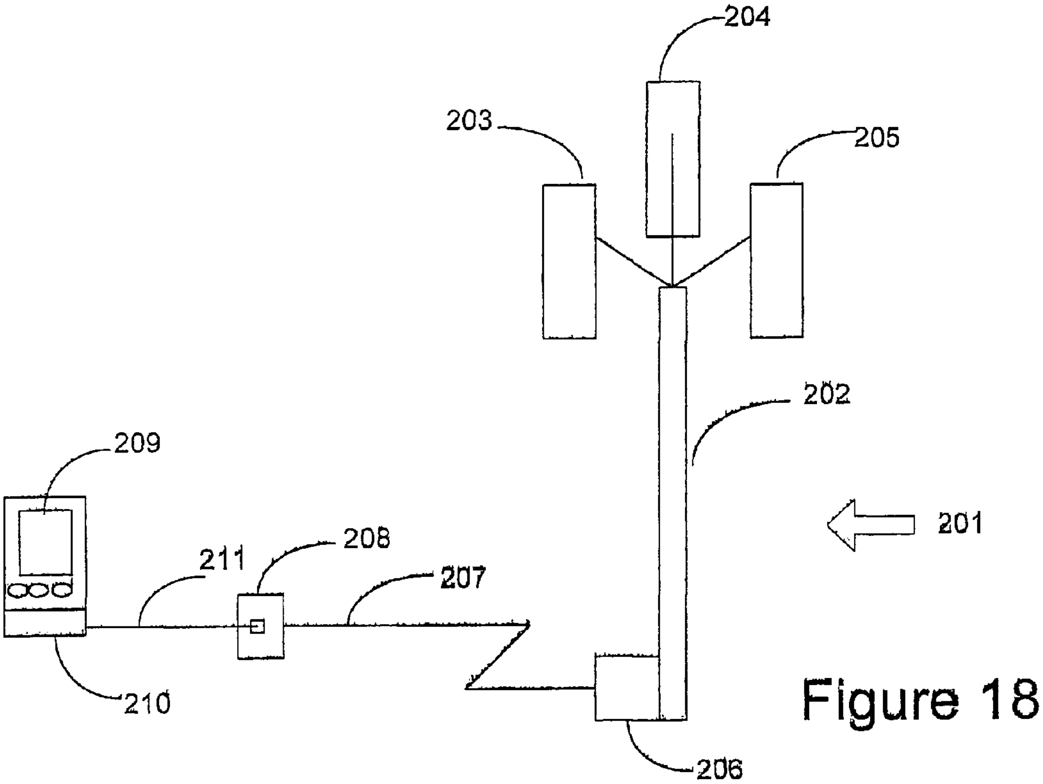
FIG. 18: shows an antenna system according to a first embodiment.

Referring to FIG. 18 there is an antenna system 201 consisting of a structure 202 supporting a plurality of antennas 203 to 205. Each of the antennas 203-205 may be any one of the antennas shown in FIGS. 1-17. A transmission unit provides control signals to antennas 203 to 205 by injecting control data onto RF feed cables to the antennas. Transmission means 206 has an interface port connected via serial cable 207 to socket 208. A PDA, such as a Palm Pilot™, is connected to an interface unit 210 which is connected to socket 208 via cable 211. Interface unit 210 connects to a port of PDA 209 and converts from an RS 232 serial communication protocol to an RS 485 serial protocol. Alternatively PDA 209 may connect to transmission means 206 by a direct RS 232 connection.

Figure 19:
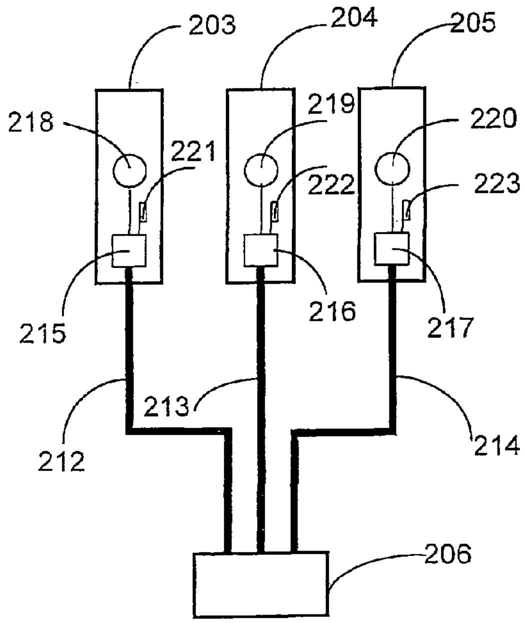
FIG. 19: shows a first control system implementation for the embodiment of FIG. 18.
Figure 20:
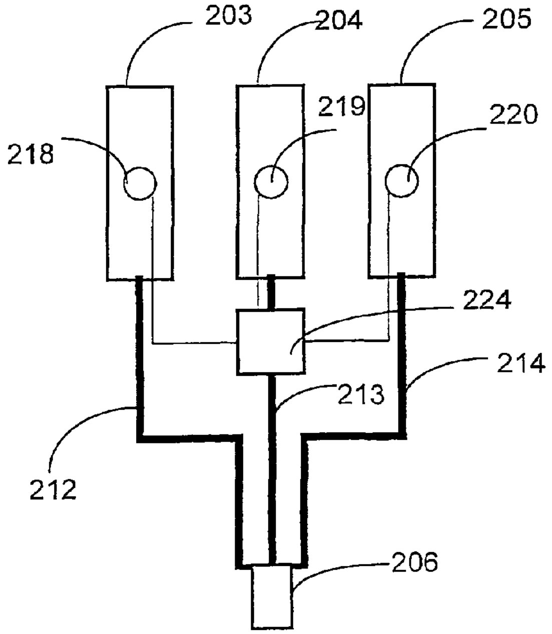
FIG. 20: shows a second control system implementation for the embodiment of FIG. 18.
Figure 21:
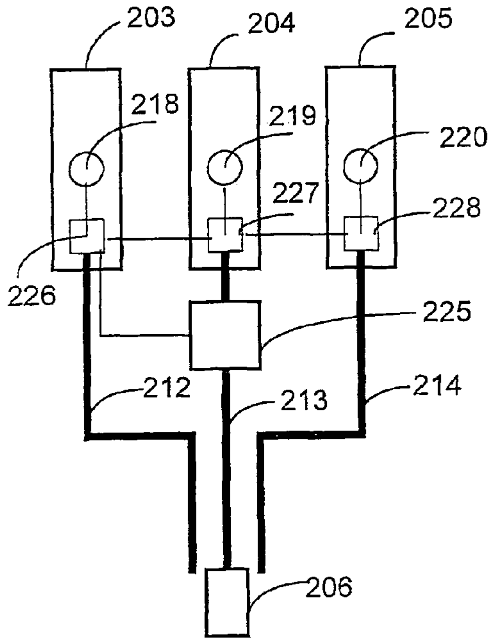
FIG. 21: shows a third control system implementation for the embodiment of FIG. 18.

FIGS. 19 to 21 show three possible control system implementations for the antenna system of FIG. 18. Like components have been given like numbers throughout.

Referring firstly to FIG. 19 a first control system implementation is shown. In this case transmission means 206 injects control data onto each RF feed line 212, 213, 214 to each antenna 203, 204 and 205. Each antenna includes an individual actuation means 215, 216, and 217 which extracts control data from the respective RF cable 212, 213 and 214 and drives actuators 218, 219 and 220 in accordance with the control data. Typically actuators 218 to 220 will be electromechanical means for relatively moving parts of one or more phase shifter of each antenna to adjust downtilt and/or azimuth and/or beam width. The use of electromechanical phase shifters ensures operating parameters remain unchanged in case of a power failure. Actuation means 215 to 217 may also include transceivers for antennas 203 to 205.

Each antenna 203, 204 and 205 is also provided with unique identification means 221, 222 and 223 this may be a chip which stores a unique number, a series of switches or resistors etc. This enables the actuation means 215, 216 and 217 to uniquely identify each antenna and provide information in association with the antenna ID. Although not shown in subsequent drawings this feature may be incorporated in each other embodiment described below.

The transmission means 206 may be provided at any convenient location, for example within a base station. The arrangement has the advantage that no specific control cabling is required to control each antenna 203, 204 and 205 or obtain information regarding each antenna. In use, a hand-held PDA (Personal Digital Assistant) 209, such as a Palm Pilot™, may be connected to transmission means 206 via suitable interface means 207, 208, 210 and 211 to facilitate communication between actuation means 215 to 217 and PDA 209. The current attributes of each antenna such as downtilt, beam width and azimuth may be downloaded to PDA 209 and adjustments made by entering data at PDA 209 and transmitting this to actuation means 215, 216 and 217. Alternatively, settings or a schedule of future settings may be downloaded from PDA 209 to actuation means 215 to 217 and the antenna operates in accordance therewith. For example, required antenna settings for different periods may be transferred as a file from PDA 209 to each actuation means 215 to 217 which will then operate in accordance with the schedule.

Referring now to FIG. 20 a second control system implementation is shown. In this case control data from transmission means 206 is extracted via a single actuation means 224 which drives each actuator 218, 219 and 220 via dedicated cables. Actuation means 224 is preferably provided at the top of a structure in close proximity to antennas 203, 204, 205 to minimise the length of cable required from actuation means 224 to antennas 203, 204 and 205. As only short connection paths are required this is still a dramatic advantage over the need to wire from the bottom of an antenna base station to each antenna.

Referring now to FIG. 21 the implementation is similar to that of FIG. 20 except that control data receiving means 225 supplies serial control data to actuation means 226, 227 and 228 which extract control data relevant to that antenna and drive actuators 218, 219 and 220. Actuation means 226, 227 and 228 may include data transceivers for antennas 203 to 205.

Figure 22:
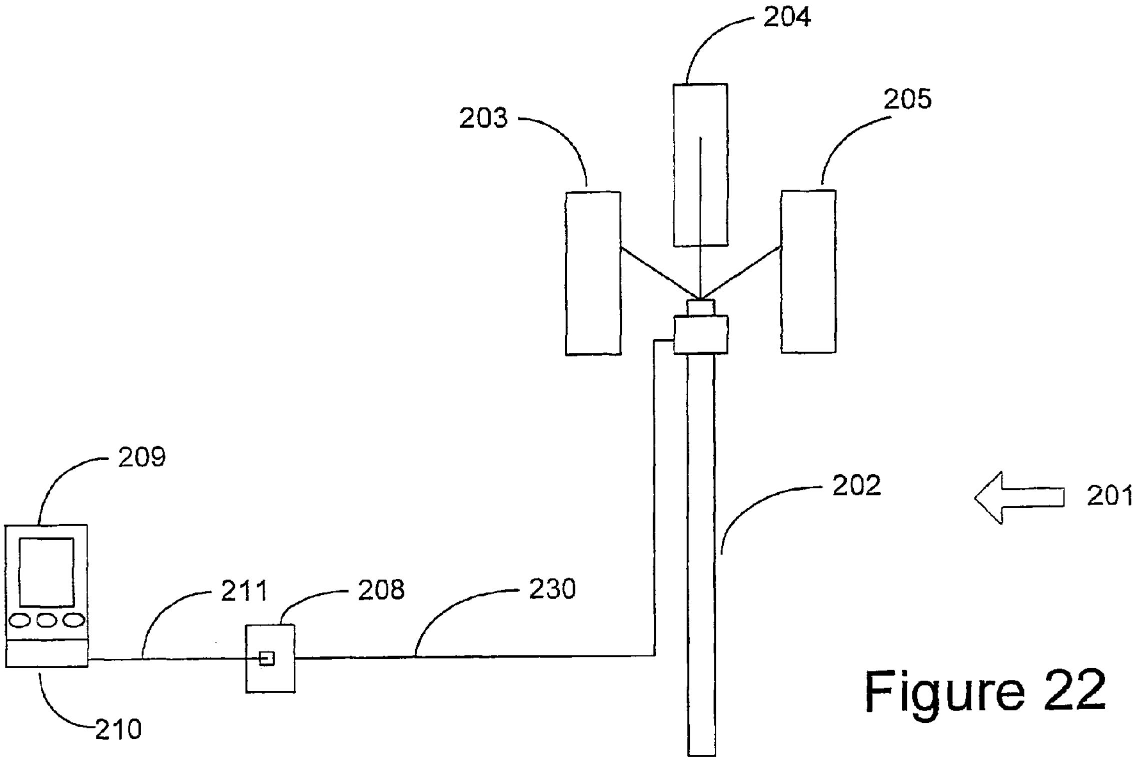
FIG. 22: shows an antenna system according to a second embodiment.

Referring now to FIG. 22 an alternative embodiment is shown where signals are supplied to the actuation means via a serial line rather than by inserting control data onto the RF feed line. In this case serial line 230 is connected from socket 208 to actuation means at the top of a structure. In all cases where a direct connection is provided, suitable lightning strike protection is required.

Figure 23:
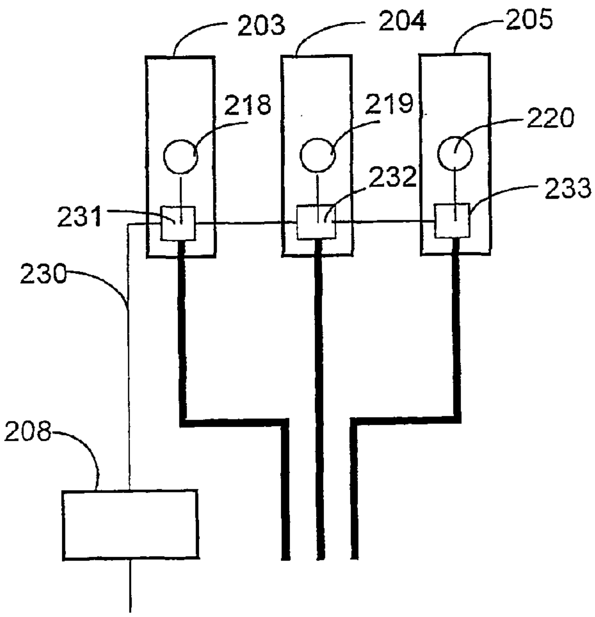
FIG. 23: shows a first control system implementation for the embodiment of FIG. 22.

As shown in the embodiment of FIG. 23 serial line 230 is connected from socket 208 to actuation means 231 of antenna 203 which is connected via a serial line to actuation means 232 and 233. In this case the serial line is an RS 485 serial connection. The medium for the RS 485 serial connection may be a twisted pair cable, coaxial cable or optical fibre cable. Other suitable protocols may include a CAN bus or a 1 Wire™ connection etc. Actuation means 231, 232 and 233 control actuators 218, 219 and 220 in accordance with control data supplied via serial line 230.

Again, details of each antennas current configuration may be downloaded from actuation means 231, 232 or 233 to PDA 209 and operating parameters may be adjusted in real time or a file may be downloaded from PDA to each actuation means 231 to 233 to schedule operation of the antennas.

Figure 24:
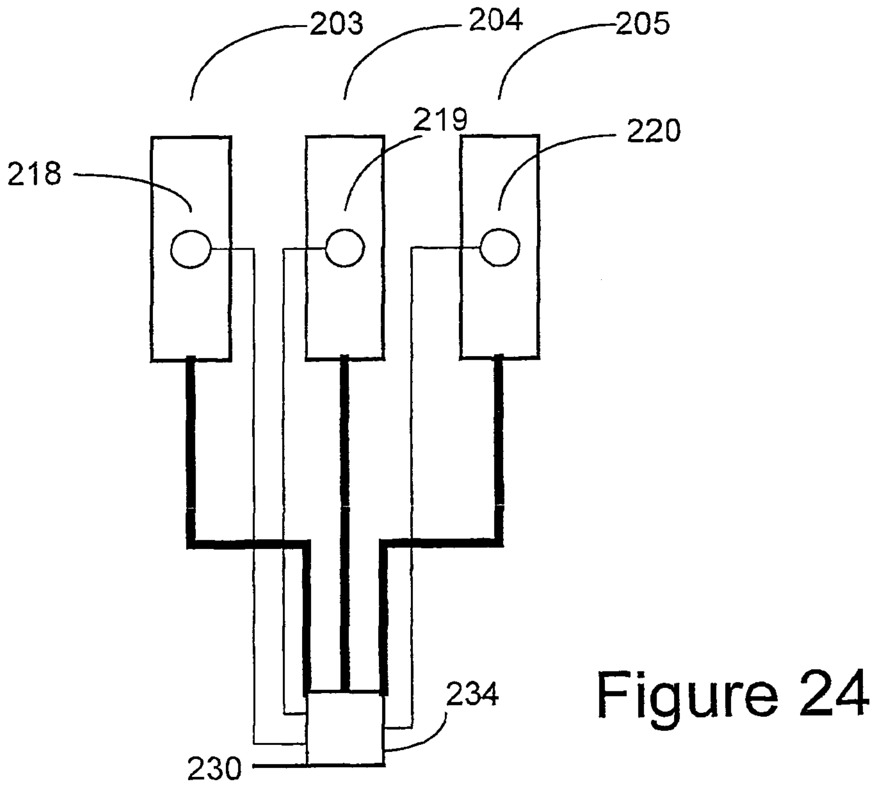
FIG. 24: shows a second control system implementation for the embodiment of FIG. 22.

Referring now to FIG. 24, a second implementation of the embodiment of FIG. 21 is shown. In this case a single actuation means 234 directly drives actuators 218, 219 and 220 in accordance with control data supplied via serial line 230. This arrangement is simpler in requiring only one actuation means 234 per site rather than one per antenna. Actuation means 234 may also include transceivers for each antenna 203, 204 and 205.

It will be appreciated that both implementations require only a single serial cable to be provided to an actuation means to enable control of all antennas of an cellular antenna base station. This simply requires new antennas to be connected at the mast head to the actuation means without any additional cabling from the actuation means to the base of the support structure to be installed.

Figure 25:
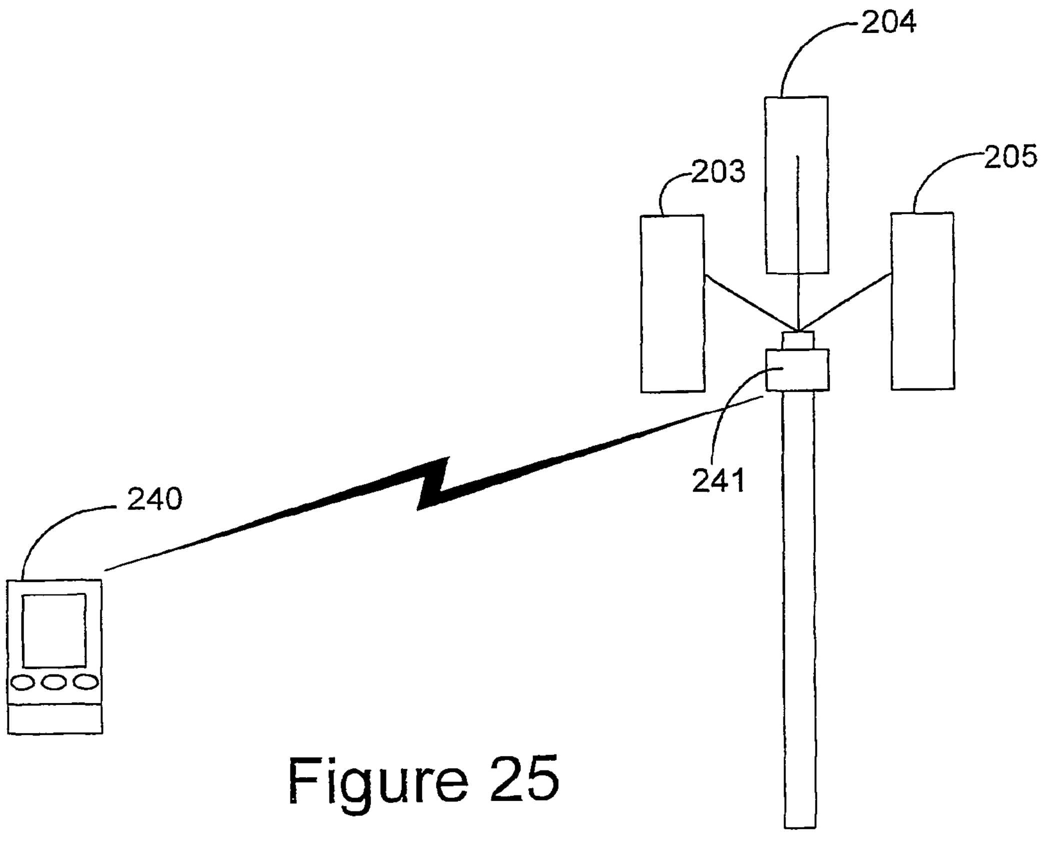
FIG. 25: shows an antenna system according to a third embodiment.
Figure 26:
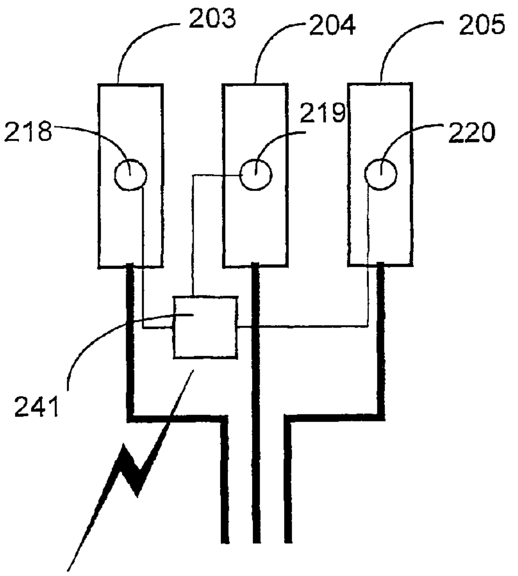
FIG. 26: shows the control system of the embodiment shown in FIG. 25.

Referring now to FIG. 25 a wireless embodiment is shown. In this embodiment a PDA 240 capable of transmitting and receiving wireless communications communicates with actuation means 241 of an antenna system 201. Alternatively, PDA 240 may interface with a wireless transceiver via a port, such as a serial communication port. As shown in FIG. 26, actuation means 241 may directly drive actuators 218, 219 and 220 of antennas 203, 204 and 205. Wireless communication may be via suitable radio frequency communication, although care must be taken to avoid interference with the cellular base station. Alternatively, optical or other wireless communications may be employed. Infrared communications may be utilised or an optical fibre may be connected between actuation means 241 and a connector adapted to engage with an optical port of PDA 240. Wireless communication has the advantage that lightning protection is not required.

Figure 27:
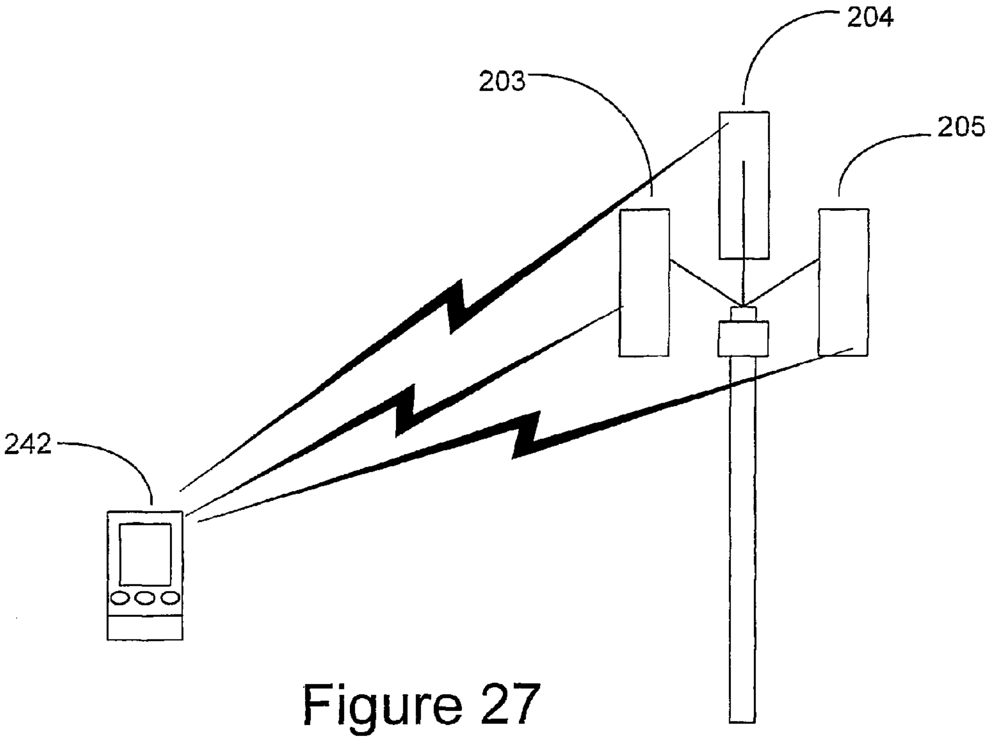
FIG. 27: shows an antenna system according to a fourth embodiment.
Figure 28:
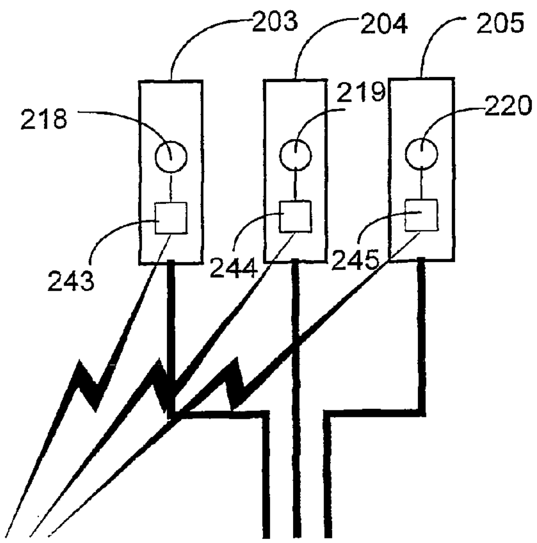
FIG. 28: shows a control system implementation for the embodiment of FIG. 27.

Referring now to the embodiment of FIGS. 27 and 28, PDA 242 communicates directly with each actuation means 243 to 245 to control actuators 218 to 220 directly. This embodiment has the advantage that each antenna 203, 204, 205 is self contained and no additional wiring is required when each antenna is installed.

Where reference is made above to actuators 218, 219 and 220 it will be appreciated that the number of actuators used in each antenna will vary depending upon the functionality of the antenna i.e. whether downtilt or beam width adjustment and/or azimuth adjustment are employed.

Power may be supplied to each actuation means by a draw off from the RF feed lines, separate power supply lines or an independent power supply, such as solar cells charging a battery. A separate power line may be integrated with a serial communication line, where utilised, and connected to each actuation means in series. An independent power supply may be integrated into each antenna or the actuation means.

In the embodiments described above the actuation means have been utilised to control phase shifters in the feed path to antenna radiating elements and may include data transceivers for the antennas. The control system of the invention could be extended so that the actuation means controls a number of other elements of the antenna system. Low noise amplifiers at the top of the structure may be actively controlled via the actuation means to adjust gain. Filters could be actively controlled by the actuation means. In some applications duplexers and/or diplexers may also be controlled to switch between bidirectional to unidirectional operation or visa versa.

It is further envisaged that the main transmitters and receivers of a cellular base station could be provided at the top of a structure near the antennas. A single optical link could be utilised to convey telecommunications data as well as control data. The actuation means could be integrated with the base station equipment, or remain separate therefrom.

Figure 29:
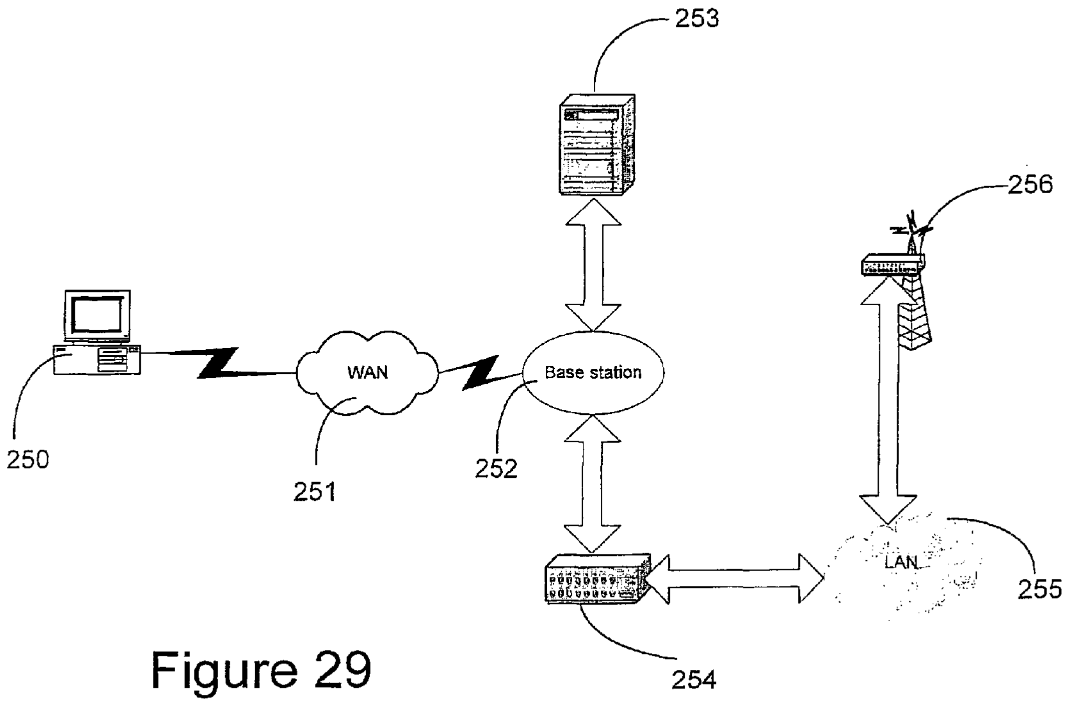
FIG. 29: shows a remote control system according to a first embodiment.

Referring now to FIG. 29 a system for remote information acquisition or control of antenna systems is shown. In this case a computer 250 is connected via a WAN 251 to base station 252. The WAN may be a switched circuit or packet switched connection using internet protocols or cellular packet protocols as required. The base station communicates with base station network hardware 253 and an antenna control unit 254. Antenna control unit 254 communicates via LAN 255 with an antenna actuation means 256. In the embodiment of FIG. 18, antenna control unit 254 may correspond with transmission means 206 and actuation means 215 to 217, 224 and 225 to 228 may correspond to actuation means 256. In the embodiment of FIGS. 23 and 24 actuation means 256 may correspond to actuation means 231 to 233 and 234.

The embodiment of FIG. 29 enables a network operator to control an antenna system via communications with the base station. This enables a network operator to download information regarding the current configuration of any antenna, to actively control the configuration of any antenna, and to download to actuation means 256 a schedule of operation for any antenna. A table of concordance between antenna identification means (see 221 to 223 in FIG. 19) may be maintained at computer 250 so that a network operator can address antennas via a network operator assigned identification code.

Figure 30:
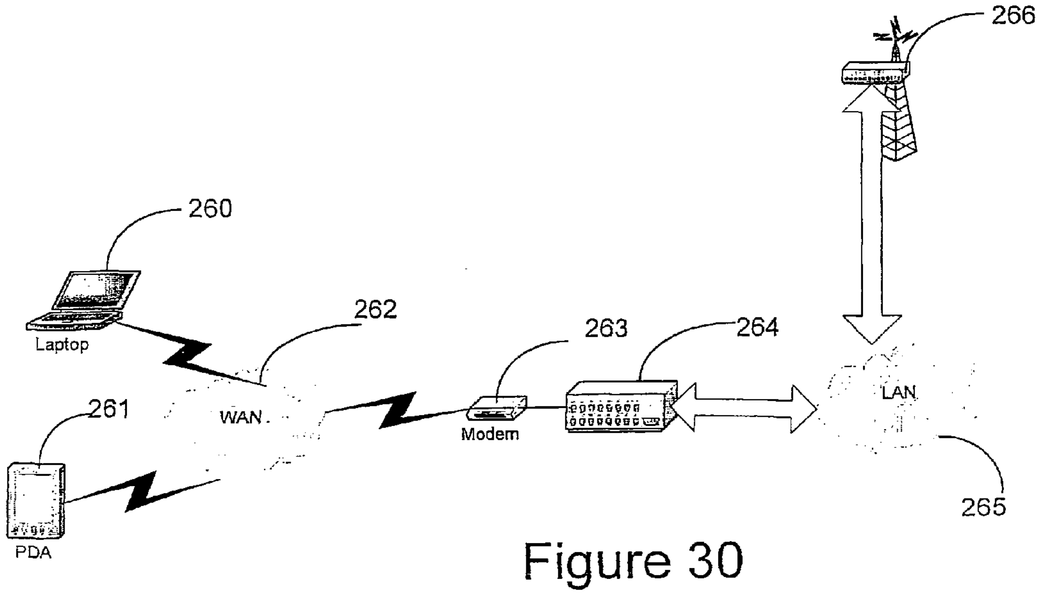
FIG. 30: shows a remote control system according to a second embodiment.

Referring now to FIG. 30 a remote control system over a standard telecommunications network is shown. In this case a device such as a lap top 260 or PDA 261 communicates via a telecommunications network 262 with data communications equipment 263 interface to antenna control unit 264. Data communications equipment 263 may be a router, modem, bridge etc. Antenna control means 264 may communicate with an actuation means 266 via LAN 265. Actuation means 266 may correspond to actuation means 215 to 217, 224, 225 to 228, 231 to 233, 234, 241 or 243 to 245 of the embodiments previously described. It will be appreciated that devices 260 and 261 may communicate directly with actuation means 266 if located locally. This system enables remote data acquisition and control by a network operator via a standard telecommunications connection. This allows control of an antenna system remotely via a base station or separate telecommunications channel without having to conform to any third party hardware or protocol standard.

LANs 255 and 265 may be twisted pair, coaxial or optical fibre serial data communication links employing a suitable communication protocol as desired.

Figure 31:
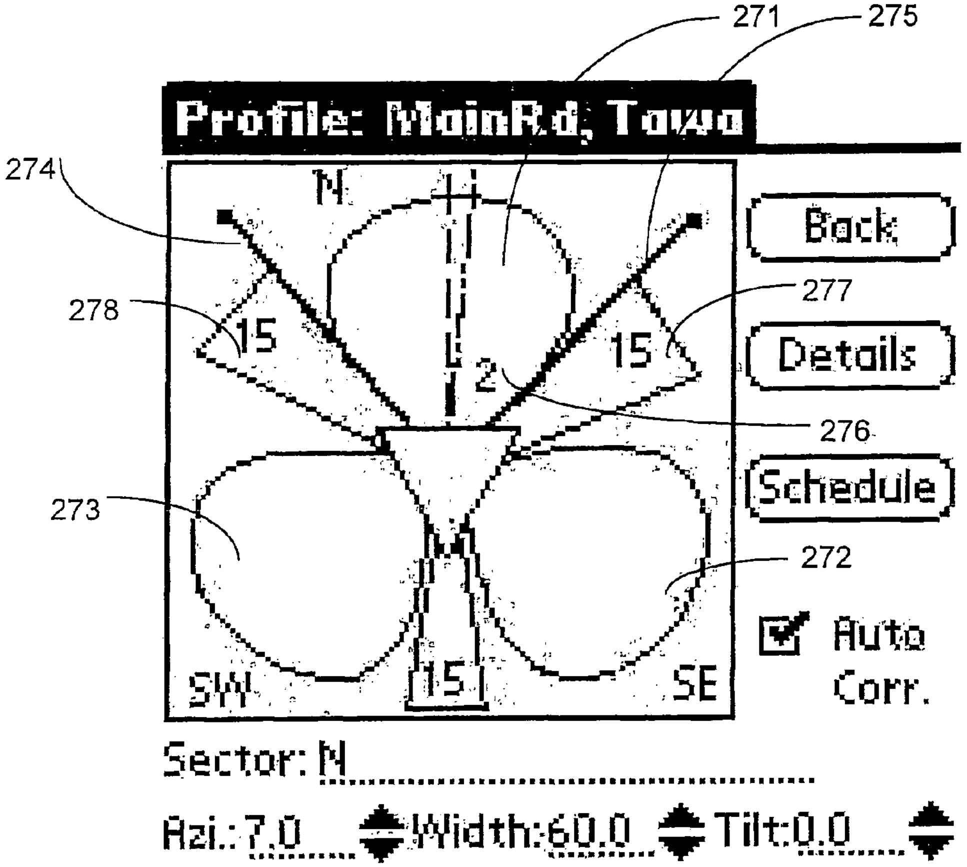
FIG. 31: shows a graphical user interface according to one embodiment.

Referring now to FIG. 31 the graphical user interface of a PDA will be described. It will be appreciated that the description below is directly applicable to a computer using an input device such as a mouse. FIG. 31 shows a number of graphical elements illustrating beam coverage for a three sector cellular communication site. Lobes 271, 272 and 273 illustrate the beam coverage of the three antennas of the telecommunication site. If lobe 271 is selected, for example by tapping the screen with a stylus, control bars 274 and 275 may appear. By clicking the stylus on one bar and moving it to a desired position the shape of lobe 271 may be adjusted. The shape of lobe 271 may be likewise adjusted utilising bar 275. It will be appreciated that by adjusting bar 274 and 275 both azimuthal steering and azimuthal beam width may be adjusted for lobe 271. The numerical value of the angle of azimuth steering from normal and the numerical variation of beam width may be indicated. In the example shown in FIG. 31 an azimuth steering variation of 2° is indicated by numeral 276 and a narrowing of the beam width by 15° on either side is indicated by numerals 277 and 278.

Each lobe 271, 272, 273 may be adjusted in this way and when a desired configuration is achieved this information may be sent to an actuation means as described above so that the actual antenna settings are adjusted to concur with those shown on the graphical user interface. Likewise, the actual settings of an antenna may be downloaded from the actuation means and displayed on the screen of a PDA. This enables the current configuration to be displayed in an easily comprehensible manner and for adjustments to be made via the use of a convenient graphical user interface.

In a refinement of the method described above a means for automatic compensation may also be provided. When one antenna is adjusted this may result in gaps in coverage. To adjust for this the operating parameters of the other antennas may be automatically adjusted to ensure the required coverage is still maintained. The required coverage and optimisation parameters may be set for each site. The automatic compensation may automatically calculate the required operating parameters for the antennas based on this information. In some cases it may be necessary to provide coverage in all directions. In other situations only certain regions may require coverage. Within different regions different capacity may be required. The automatic compensation means optimises the coverage and sharing of capacity between sectors for the site constraints.

Figure 32:
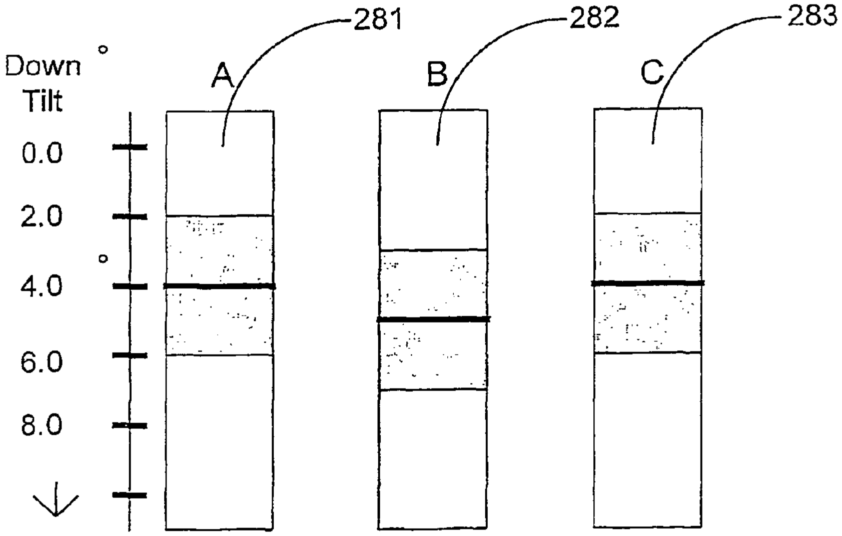
FIG. 32: shows a user interface for adjusting downtilt.

Referring now to FIG. 32 a graphical user interface for adjusting downtilt is shown. The graphical user interface is in the form of control bars 281, 282 and 283 for adjusting downtilt for each site.

Figure 33:
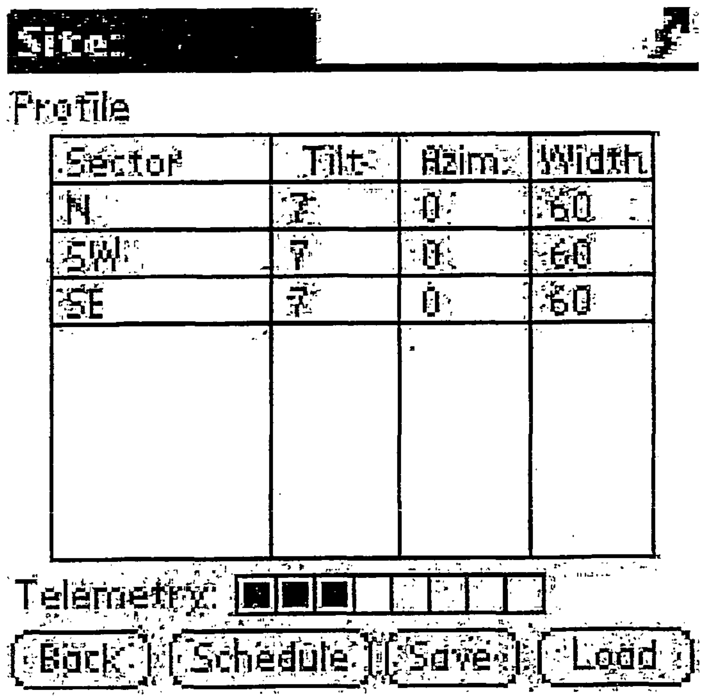
FIG. 33: shows a tabular interface.

Referring now to FIG. 33 a simple table display interface is shown. In this case the beam tilt, beam azimuth and beam width may be viewed in table form and adjusted by selecting a box and entering a value.

Figure 34:
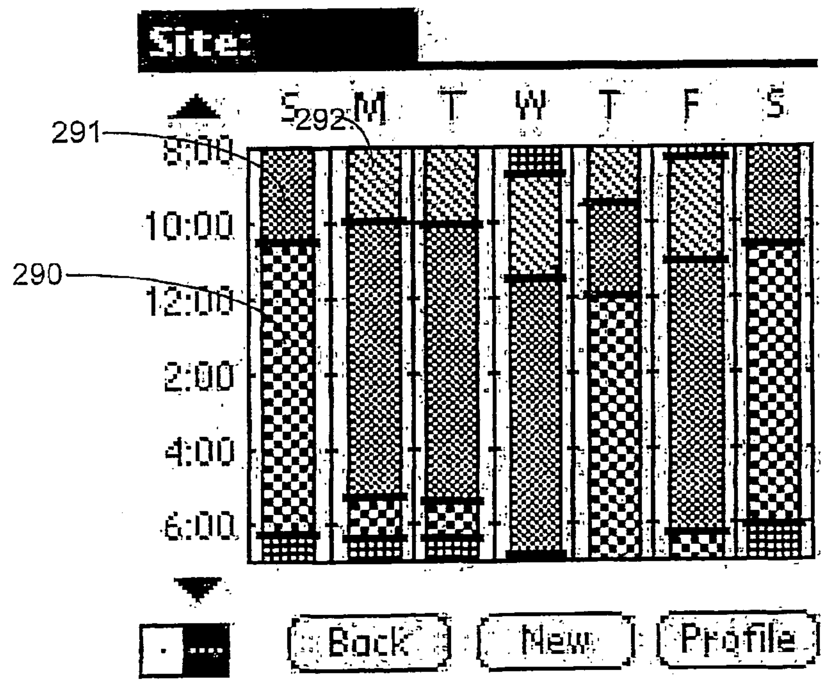
FIG. 34: shows a scheduling interface.

Referring now to FIG. 34 a scheduling interface is shown. Using the scheduling interface, operational parameters for the antennas may be set utilising the graphical user interface of FIG. 31 or 33. A user may then define the periods during a week over which that configuration is to be used. Other configurations may be likewise identified for other periods. As shown in FIG. 34 configurations 290, 291 and 292 are seen to be scheduled for different periods during a week. Such a schedule may be created at a PDA, computer etc and the entire schedule may be downloaded to an actuation means which then controls the antenna according to the schedule.

This enables a network operator to allocate capacity to match demand as it varies over time. This enables more efficient use of available spectrum. Theoretical calculations indicate that significant improvements in network capacity may be achieved utilising such active sector control. Such controllability may reduce the number of sites required to provide coverage to an area, allow concentrated coverage for small geographical areas for peak demands without providing specific coverage (e.g. to cover events at stadiums etc). The flexibility of the system also allows disaster coverage in case there is a failure at a site and avoids downtime associated with site maintenance.

The present invention provides an antenna system allowing ease of control and programmability using standard devices such as PDAs. The system facilitates the addition of new antennas requiring minimal additional wiring.

The invention also provides an antenna in which downtilt and beam width, azimuth and beam width or azimuth, beam width and downtilt of the beam of an antenna may be independently and remotely controlled. The antenna thus allows great flexibility in control of the beam of the antenna to actively control the region covered by an antenna beam in a cellular communications system.

Where in the foregoing description reference has been made to integers or components having known equivalents then such equivalents are herein incorporated as if individually set forth.

Although this invention has been described by way of example it is to be appreciated that improvements and/or modifications may be made thereto without departing from the scope or spirit of the present invention.

The invention claimed is:

1. An antenna for communicating with mobile devices in a land-based cellular communication system via an antenna beam having a width and an angle, the antenna including:

a plurality of radiating elements; and a feed network from a feed line to the radiating elements, the feed network including:

adjustable power dividing means for varying the division of power between radiating elements so as to vary the width of the antenna beam;

adjustable phase shifting means for varying the phase of signals supplied to or received from the radiating elements so as to vary the angle of the antenna beam; and a land-base antenna system including one or more antennas;

control means adapted to provide signals to the antenna(s) to adjust a characteristic of the antenna beam;

wherein the control means includes:

means for receiving a command to change a beam characteristic of one of the antennas;

means for calculating the beam characteristics required for all of the antennas to achieve a desired coverage; and means for adjusting one or more beam characteristic of each antenna as required to achieve the desired coverage.

2. The antenna of claim 1 wherein the power dividing means divides power between one or more central radiating elements and two or more outer radiating elements positioned on opposite sides of the central radiating element(s).

3. The antenna of claim 2 wherein the phase shifting means adjusts the relative phase between the pair of outer radiating elements.

4. The antenna of claim 3 wherein the phase relationship between the central radiating element(s) and the power dividing means is substantially fixed for all values of beam angle.

5. The antenna of claim 2 wherein the angle is an azimuth angle.

6. The antenna of claim 2 wherein the angle is a downtilt angle.

7. The antenna of claim 2 wherein the phase shifting means can vary the azimuth and downtilt angle of the antenna beam.

8. The antenna of claim 1 wherein the power dividing means is substantially non-attenuating.

9. The antenna of claim 1 wherein the or each phase shifting means is adjusted by varying the relative position of two or more phase shifting components.

10. A land-based antenna system including one or more antennas according to claim 1 and an encoder for encoding downlink signals for transmission to the radiating elements according to a code-division multiplexing (CDMA) scheme.

11. The land-based antenna system of claim 10 including control means adapted to provide signals to the antenna(s) to adjust a characteristic of the antenna beam.

12. The system of claim 11 wherein the control means includes:

graphical user interface means for graphically displaying parameters of the configuration of a plurality of antennas wherein, via use of an input device, the graphical elements may be manipulated to adjust parameters of the configuration; and communication means for sending control signals to an actuation means to adjust parameters of an antenna in accordance with those displayed by the graphical user interface.

13. A land-based cellular communication system including one or more systems according to claim 10, and a remote control center for issuing commands to each system to adjust antenna beam characteristics of each system.

14. A land-based antenna system including one or more antennas according to claim 1, and a decoder for decoding uplink signals received from the radiating elements according to a code-division multiplexing (CDMA) scheme.

15. The system of claim 1 wherein the control means comprises a local receiver adapted to receive commands from a remote control center.

16. An antenna system as claimed in claim 1, further comprising:

control means for driving electromechanical means associated with each phase shifting means wherein the control means includes processing means to control the antenna in accordance with control data supplied thereto.

17. The antenna of claim 1 wherein the power dividing means includes:

an adjustable phase shifter for adjusting the relative phase between signals on a pair of signal lines; and a hybrid coupler which is coupled to the pair of signal lines.

18. The antenna of claim 17 wherein the adjustable phase shifter adjusts the length of one of the pair of signal lines compared to the length of the other signal line.

19. The antenna of claim 17 wherein the hybrid coupler is a 90 degree hybrid coupler.

20. The antenna of claim 17 wherein the power coupler further includes a splitter/combiner coupled to the pair of signal lines.

21. The antenna of claim 20 wherein the splitter/combiner is a hybrid coupler.

22. The antenna of claim 21 wherein the splitter/combiner is a 90 degree hybrid coupler.

23. An antenna system as claimed in claim 1, wherein control signals are provided to the antenna(s) over a wireless link.

* * * * *